United States Patent
Battlogg

(10) Patent No.: US 6,705,262 B2
(45) Date of Patent: Mar. 16, 2004

(54) VALVE MECHANISM, IN PARTICULAR FOR INTERNAL COMBUSTION ENGINES OF MOTOR VEHICLES

(76) Inventor: Stefan Battlogg, Haus Nr. 186, A-8771 St. Anton/Montafon (AT)

( * ) Notice: Subject to any disclaimer, the term of this patent is extended or adjusted under 35 U.S.C. 154(b) by 0 days.

(21) Appl. No.: 10/074,811

(22) Filed: Feb. 12, 2002

(65) Prior Publication Data

US 2002/0073947 A1 Jun. 20, 2002

Related U.S. Application Data

(63) Continuation of application No. PCT/AT99/00198, filed on Aug. 12, 1999.

(51) Int. Cl.$^7$ .................................................. F01L 1/30
(52) U.S. Cl. .............................. 123/90.26; 123/90.24; 123/90.34; 123/90.6; 123/90.52; 74/567; 251/251
(58) Field of Search ............................ 123/90.15, 90.16, 123/90.24, 90.26, 90.34, 90.52, 90.6; 74/567; 251/251

(56) References Cited

U.S. PATENT DOCUMENTS

| | | | |
|---|---|---|---|
| 1,591,607 A | * 7/1926 | Breitenfelt | 123/90.49 |
| 1,735,695 A | * 11/1929 | Rich | 123/90.51 |
| 1,937,152 A | 11/1933 | Jünk | |
| 2,858,818 A | * 11/1958 | Bailey | 123/90.26 |
| 4,615,310 A | * 10/1986 | Umeha et al. | 123/90.34 |
| 4,711,202 A | * 12/1987 | Baker | 123/90.26 |
| 4,876,916 A | * 10/1989 | Maier | 74/567 |
| 5,431,131 A | * 7/1995 | Kuhn et al. | 123/90.6 |
| 5,664,463 A | * 9/1997 | Amborn et al. | 74/567 |
| 5,931,130 A | * 8/1999 | Lucarini | 123/90.24 |

FOREIGN PATENT DOCUMENTS

| | | |
|---|---|---|
| DE | 37 00 715 A1 | 7/1987 |
| EP | 0 355 659 A1 | 2/1990 |
| EP | 0 384 361 A3 | 8/1990 |
| EP | 0 429 277 A1 | 5/1991 |
| GB | 19193 | 6/1914 |
| GB | 434247 | 8/1935 |
| GB | 741831 | 12/1955 |

* cited by examiner

*Primary Examiner*—Weilun Lo
(74) *Attorney, Agent, or Firm*—Laurence A. Greenberg; Werner H. Stemer; Ralph E. Locher

(57) ABSTRACT

A valve lift mechanism, in particular for internal combustion engines of motor vehicles, has a driven cam element, a valve control member which can be driven (translational movement or pivot rotation) by the cam element, and a flexible enveloping element, wherein the cam element is rotationally mounted The enveloping element is movably connected to the valve control member in the plane perpendicular to the axis of rotation of the cam element.

24 Claims, 17 Drawing Sheets

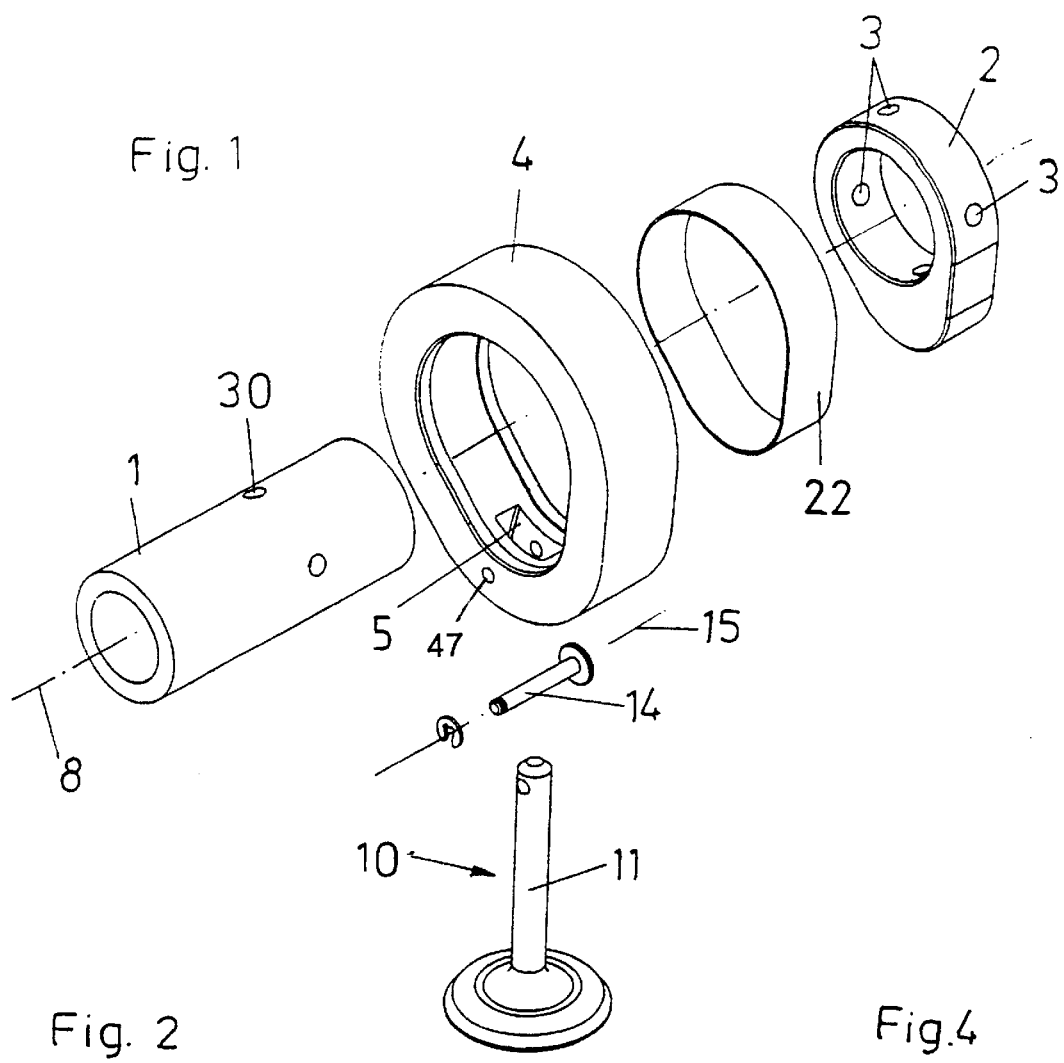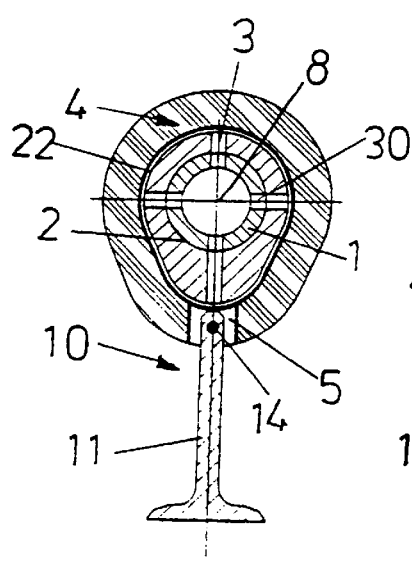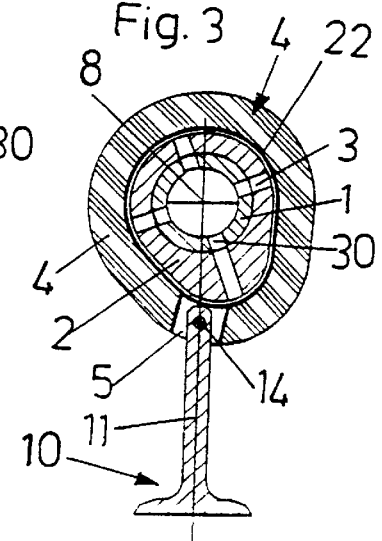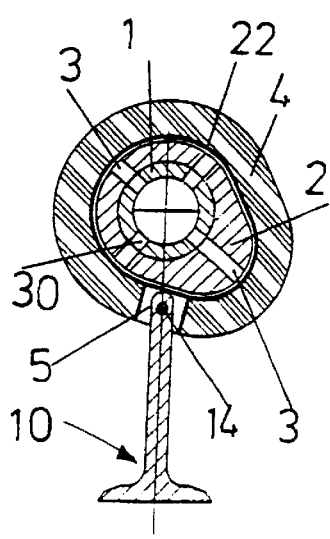

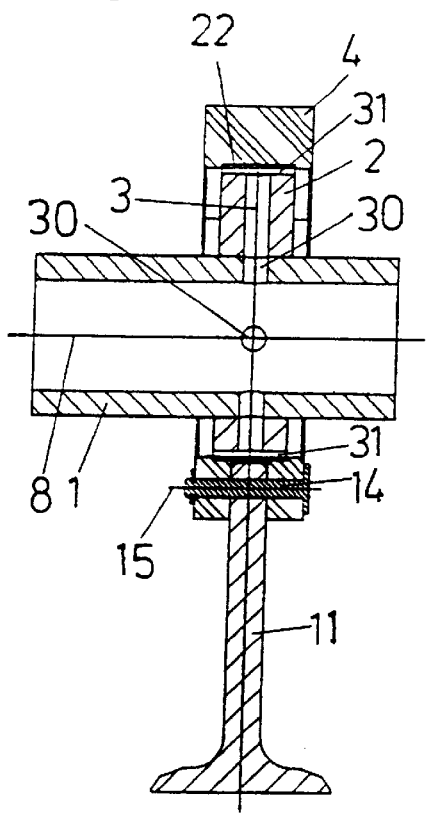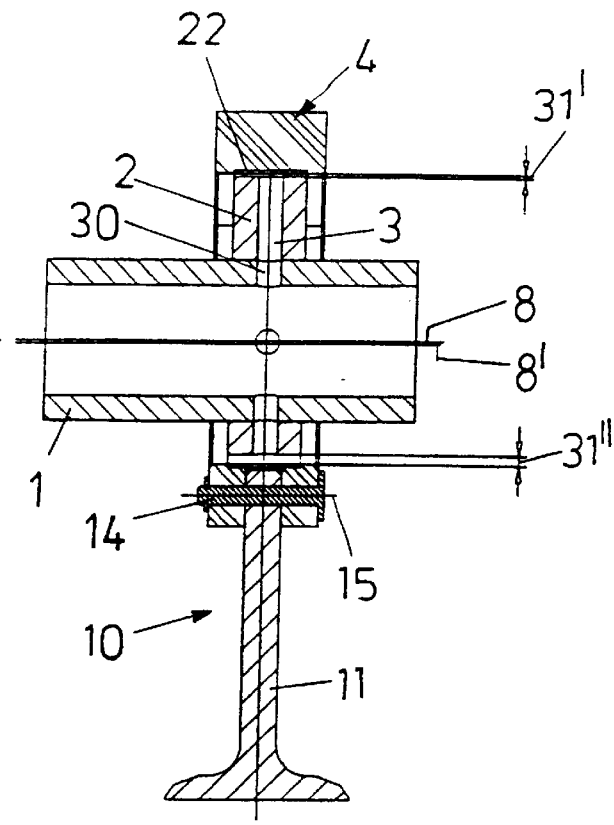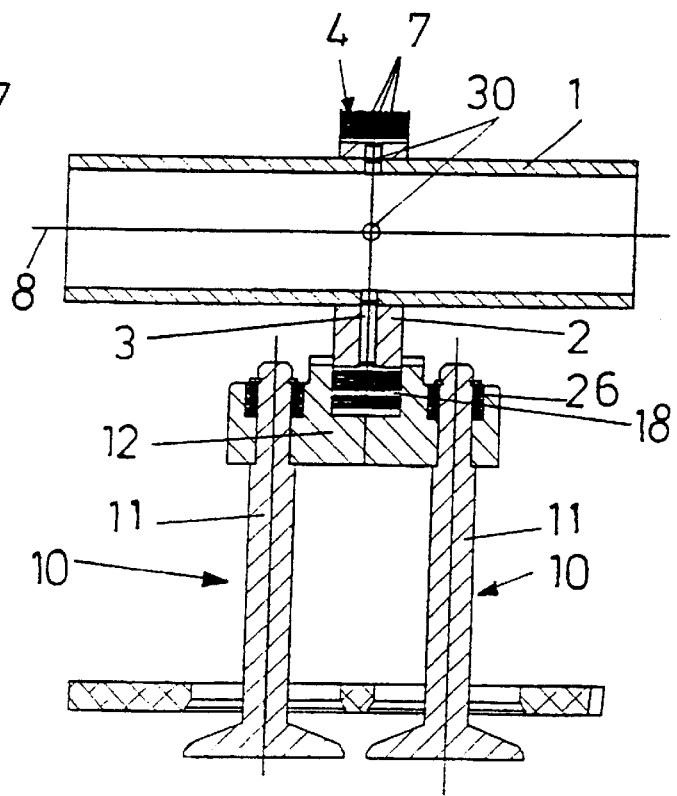

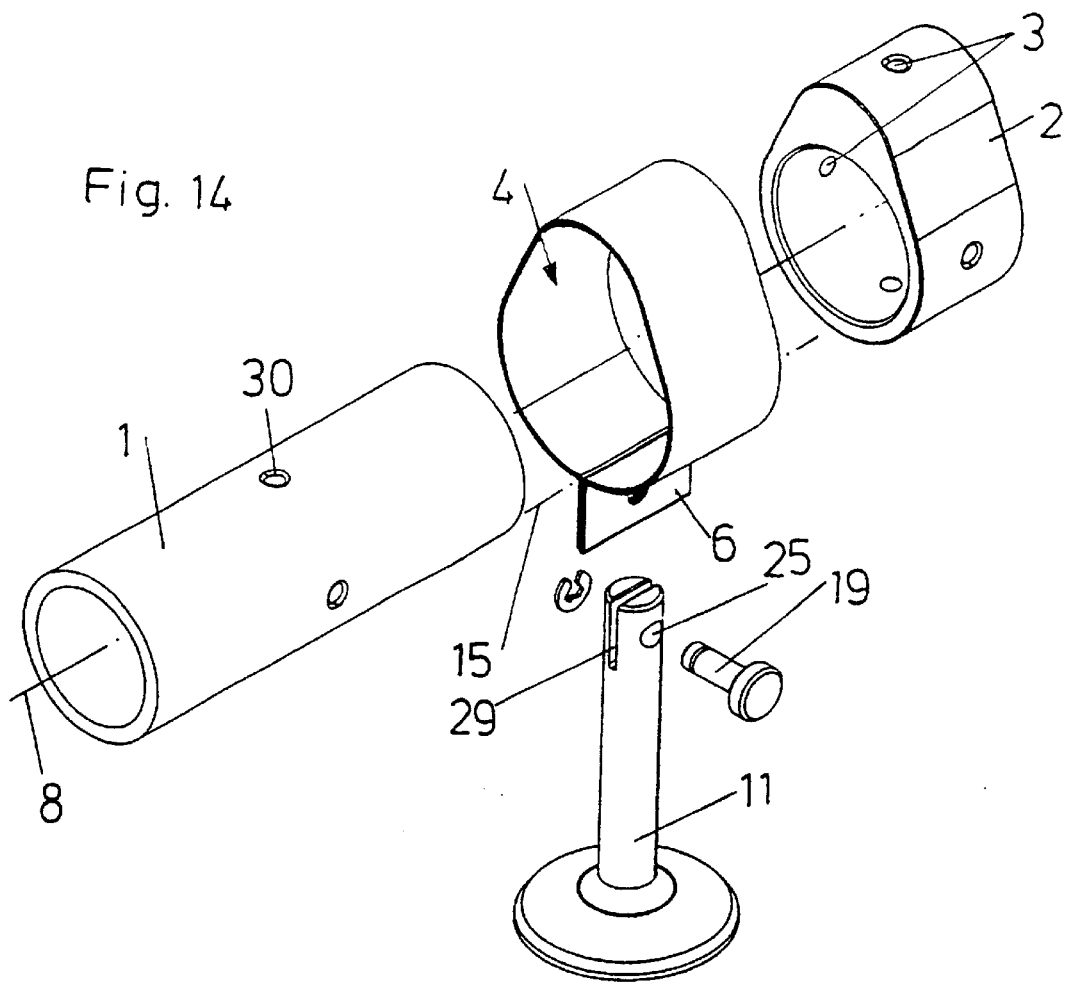
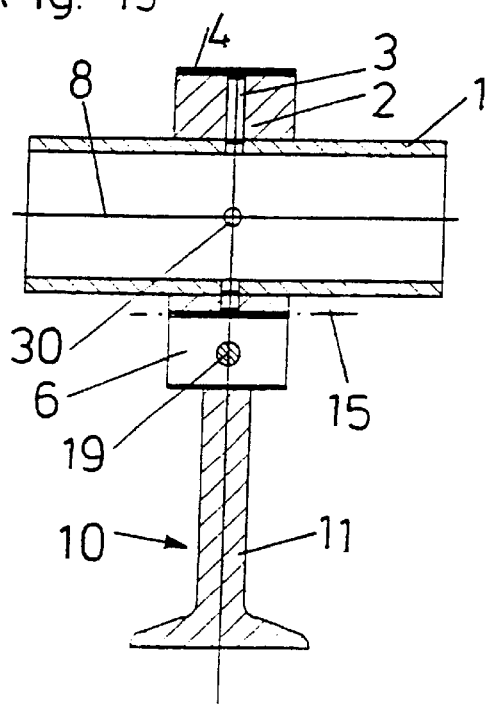
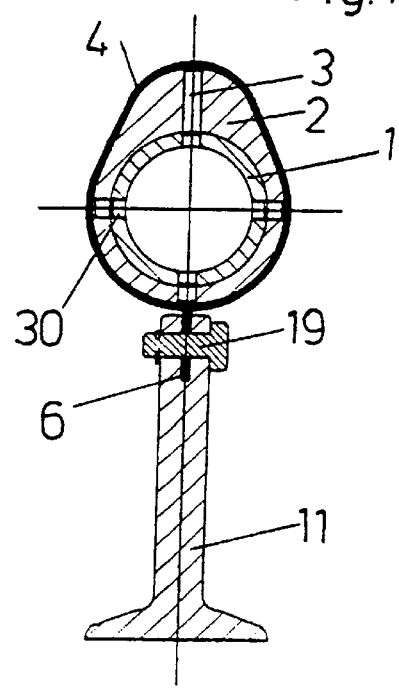

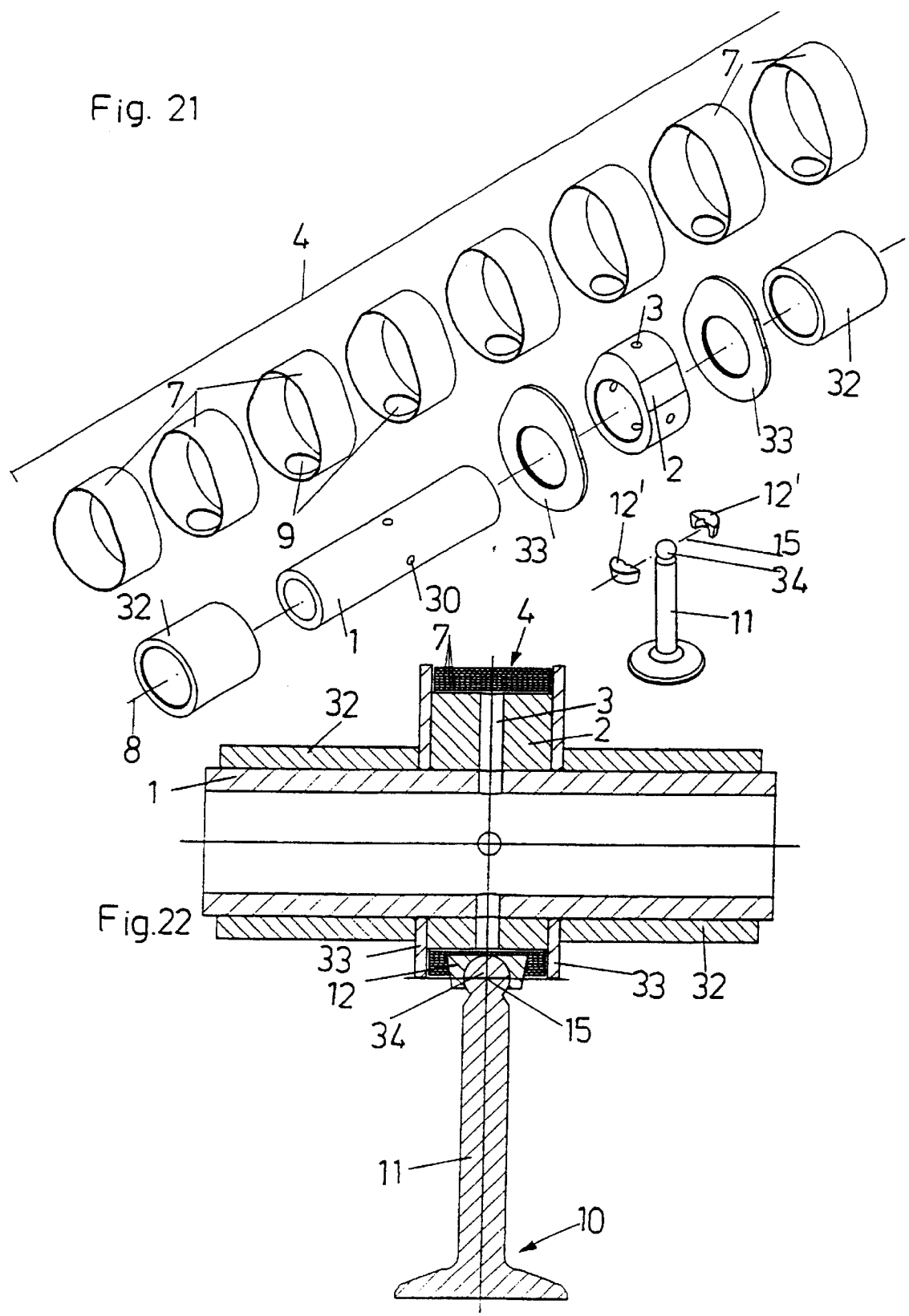

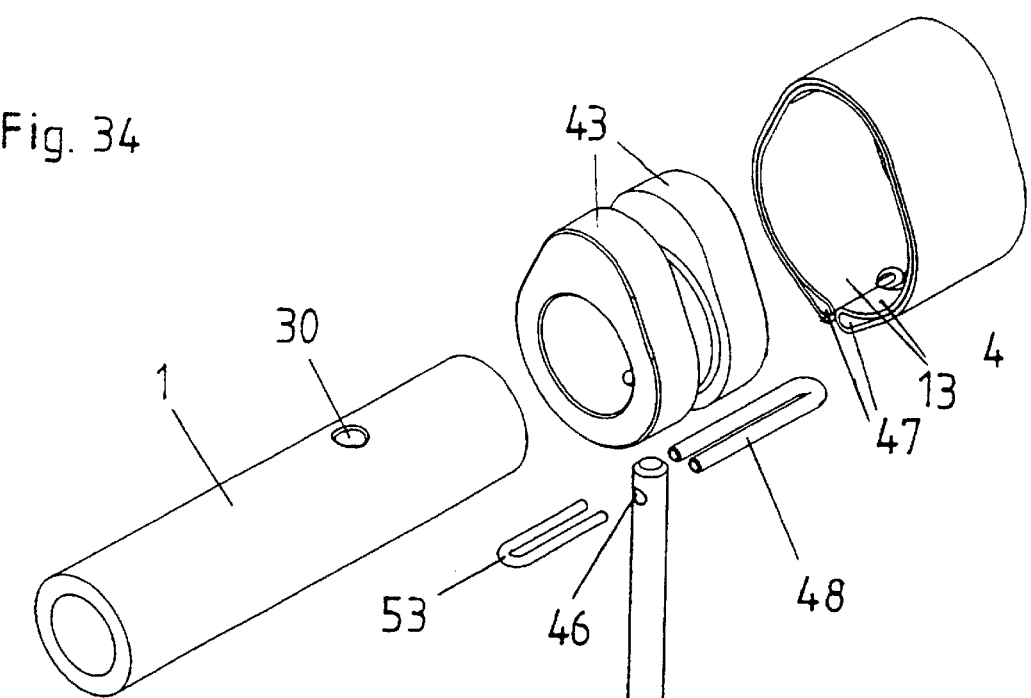
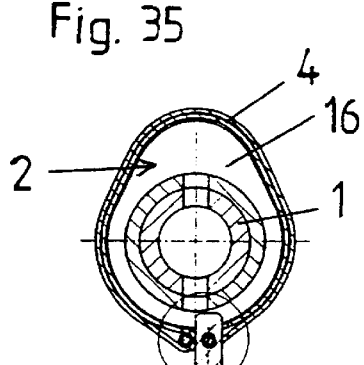
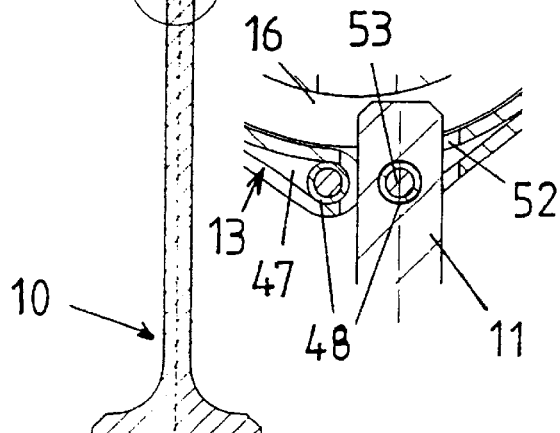
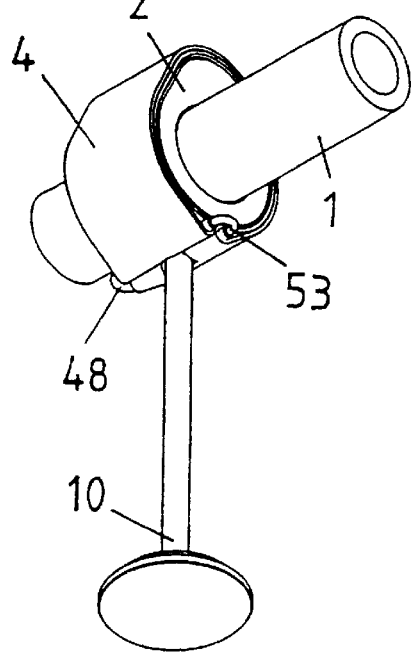

VALVE MECHANISM, IN PARTICULAR FOR INTERNAL COMBUSTION ENGINES OF MOTOR VEHICLES

CROSS-REFERENCE TO RELATED APPLICATION

This application is a continuation of copending International Application No. PCT/AT99/00198, filed Aug. 12, 1999, which designated the United States.

BACKGROUND OF THE INVENTION

Field of the Invention

The invention relates to a valve mechanism, in particular for internal combustion engines of motor vehicles, with a driven cam element and with a valve actuator displaceable or pivotable by the cam element.

Valve mechanisms for the valve control of internal combustion engines, in particular for motor vehicles, conventionally have a device (spring, hydraulic element, etc.), by means of which the valve is acted upon in the closing position. At least during the open phase, therefore, the valve actuator (valve tappet, drag lever, rocker arm or the like) is pressed against part of a closed valve control surface, said part being eccentric to the shaft axis. During the closing of the valve, care must be taken to ensure that the valve disk does not strike the valve seat too quickly, since it otherwise rebounds. This requires relatively complicated coordination between the masses to be moved, the forces arising, the material properties, etc.

There has therefore been no lack of proposals for guiding the valve actuator positively on the cam element, various embodiments having been developed, which are each based on two eccentric valve control surfaces instead of the return spring. Actual versions may be gathered, for example, from GB patent specification 19,193 (1913) and GB patent specification 434,247, wherein the cam element has, on at least one end face, a groove, the two side walls of which form the valve control surfaces. A roller or the like arranged at the end of the valve actuator engages into the groove from the side. A cam element having a surrounding web is known, for example, from European patent publication EP 429,277.

Further examples of positive guides make use, instead of valve control surfaces parallel to the axis of rotation of the camshaft, of two valve control surfaces which are arranged axially one behind the other and are formed on two differently shaped camshaft elements, for example European patent publications EP 355 659 B, and EP 384 361 A, etc.

Both the first version of the positive guides with end-face grooves and the lateral engagement of the sensing element and the second version with two cam elements and two sensing elements for each valve have, as compared with the first-mentioned valve mechanism with a return spring, an increased axial extent and a greater number of components which present either structural, spatial or economic problems.

SUMMARY OF THE INVENTION

It is accordingly an object of the invention to provide a desmodromic valve mechanism of the type mentioned above, which overcomes the above-mentioned disadvantages of the heretofore-known devices and methods of this general type and which appreciably reduces the prior art problems and constitutes a space-saving, lightweight and cost-effective design.

With the foregoing and other objects in view there is provided, in accordance with the invention, a valve mechanism, comprising:

at least one driven cam element and a valve actuator driven by said cam element;

a flexible surround element, said cam element being rotatably disposed in said flexible surround element about an axis of rotation;

a bearing pin inserted in an insertion orifice formed in said surround element, said bearing pin movably connecting said valve actuator to said flexible surround element for movement of said valve actuator in a plane perpendicular to the axis of rotation of said cam element.

In other words, the objects of the invention are achieved, according to the invention, in that the cam element is arranged rotatably in a flexible surround element which is connected movably to the valve actuator in a plane perpendicular to the axis of rotation of the cam element.

The surround element surrounds the circumference of the cam element without appreciable play, so that it is matched to the cam shape, and, because of the nature of the surround element, the cam element can rotate in the latter. Since the surround element connected to the valve actuator cannot corotate with the cam element, the travel of the cam region about the axis of rotation of the cam element is converted into a lifting or to-and-fro movement of the valve actuator mounted displaceably or pivotably in the cylinder head. The valve actuator does not execute any movement as long as the region of connection of the surround element to the valve actuator comes to bear against the base-circle region of the rotating cam element, is then moved radially away from the axis of rotation of the cam element and is finally led back again, while the cam region of the cam element passes the region of connection of the surround element to the valve actuator.

Since the surround element comes to bear, essentially free of play, against the circumferential surface of the cam element, a valve actuator freely projecting from the surround element would always be oriented perpendicularly to the tangent to the circumferential surface of the cam element and at the same time deviate from radial orientation to the axis of rotation of the cam element, on the one hand, in the rising cam region and, on the other hand, in the falling cam region. The movable connection of the surround element to the valve actuator permits the pivoting or tilting movement of the surround element in the cam region, so that the necessary freedom of movement of the valve actuator in its sliding or pivot bearing remains preserved. The surround element is therefore arranged, in particular, pivotably about an axis on the valve actuator or on a holder for the valve actuator.

Preferably, the valve actuator has a holder, to which the surround element is connected, in particular movably, and on which a part guided in the sliding or pivot bearing of the valve actuator is held preferably adjustably.

In a first version there is provision for the surround element to have an open loop, the two ends of which are fixed to a holder for the actuator. When the two ends of the open loop pass through one another or, touching one another, project from the cam element, then, because of the flexibility of the material of the surround element, a physical axis may be unnecessary, since the two ends can be jointly bent on both sides to the required extent. For connection to the valve actuator, there is preferably provision for the two ends of the open loop to have insertion orifices for a connecting element. The insertion orifices may be formed by folding round and, depending on the material of the loop, stitching, adhesive bonding, welding or the like of the folded-round end. In a particularly advantageous version, the open loop consists of a band closed on itself which is led to and fro around the cam element and the reversals of which form the insertion orifices.

In a further version, the flexible surround element is designed as a closed loop and is provided with a holder for the valve actuator. The tying of the holder into the loop can in this case be achieved in a simple way by means of a protuberance wherein the holder is arranged. The protuberance is achieved, in particular, by constricting a region of the surround element which forms an excess length, said constriction being, for example, pinched off, stitched or the like.

A closed flexible loop may be formed, for example, by a deformable ring. If the ring consists of plastic, it may also be fiber-reinforced or reinforced on the inside and/or outside with a steel or fabric band. Particularly in this version, an elastomeric plastic could also be used, which is vulcanized onto the band. For the movable connection, there is preferably provision for the ring to have a recess, wherein a bearing pin of the valve actuator is provided, the axis of said pin being parallel to the axis of rotation of the cam element.

Both and open and closed loops can be achieved when the surround element is a rope which, in particular, is inserted into a circumferential groove of the cam element, a roller chain, wherein a joint pin forms the holder of the valve actuator, a strip or band consisting of a sheetlike material, wherein threads or fibers are provided in a textile weave, or a band spring which is manufactured, for example, from a titanium alloy and surrounds the circumferential surface of the cam region in one or more turns one above the other. A closed rope can be slipped, for example, through a lug of the valve actuator or of its holder. In particular, a material formed seamlessly from threads or fibers according to a textile circular technique (circular weaving, circular knitting, etc.) is suitable for manufacturing a closed loop. A circular-woven closed loop preferably contains, as weft threads, aramid fibers which have high length constancy and temperature resistance.

The ends of an open loop element, in particular of a rope, fabric band or band spring, may be clamped on the valve actuator or its holder, be provided with insertion orifices for receiving a connecting pin or cotter or else be designed for fastening in another way.

If a plurality of turns of a band spring are arranged on the cam element, that is to say either a plurality of closed loops in successive sizes or a spiral winding, then, for fixing the holder, the turns may have bores which lie one above the other and the diameter of which decreases from the inside outward. These form a frustoconical orifice, into which can be inserted a frustoconical holder of the valve actuator, said holder requiring no further fixing. The holder may be two-part and, for example, surround a bearing part of the valve actuator, said bearing part being provided with a spherical head behind which engagement is possible. A spherical head at the end of a displaceably mounted valve shank also makes it possible for a valve tappet to be rotatable about its longitudinal axis.

In a further possibility for connecting the surround element of the holder, the holder of the valve actuator has a bearing pin, which is arranged between two turns of the band or of the band spring.

If the surround element consists of a material with a low-friction, if appropriate low-frictionally coated surface, then, if appropriate, lubrication of the sliding surfaces, that is to say of the circumferential surface of the cam element and of the coming-to-bear inner surface of the surround element is not necessary. If lubrication is desired or required, there is preferably provision for the cam element to have, radially to the axis of rotation, at least one oil bore which issues on the circumference of the cam element within the flexible surround element. Since the surround element does not rotate, an external oil supply through the surround element via a flexible line may also be envisaged.

An oil supply which, under some circumstances, is not necessary at all for maintaining the sliding properties may also be used in order to solve a serious problem in previous positive controls when the valve is pressed down faultily during the closing phase, indeed a slightly open valve also not being pressed reliably into the valve seat because of excess pressure in the cylinder. To be precise, an oil film may be built up in the slight gap between the cam element and the surround element, the oil or the oil pressure centering the surround element in relation to the cam element.

Under the action of force from outside (mass inertia forces, etc.), the surround element is pressed out of this force equilibrium, with the result that the oil gap becomes thinner at a specific point. At this point, more oil pressure builds up, which presses the surround element back into the approximately central position again, so that the system is stabilized.

This effect not only is helpful in the rotation of the cam element in the surround element, but may also be used in order to generate a valve closing force, thereby also dispensing, on the valve actuator, with a hydraulic element which, in conventional valves, brings about play compensation in the base-circle region. The oil film also has a damping function, so that the mass forces caused by the acceleration and deceleration of the valve also do not act directly on the cam element, and the engine noises are reduced.

Instead of a sliding oil film, an air cushion surrounding the cam element may also be built up by means of compressed air. This may be advantageous particularly in the case of a surround element consisting of plastic or of a plastic fabric.

In the valve mechanism according to the invention, owing to the omission of the valve spring and spring plate and to the substantially lighter form of construction of the valve tappet or rocker arm, the masses to be accelerated are reduced. The use of light metals, ceramics or plastic for the valve and/or the valve actuator allows a reduction in the masses to be accelerated and decelerated of 50% to 80% of the value of a valve tappet with a return spring and with hydraulic play compensation. The high values occur particularly in the part-load range, since the valve springs have to be designed for full-load safety. Furthermore, the valve can be made shorter, since the space-consuming valve spring is dispensed with. Moreover, the oil supply gives rise not only to linear contact, but also to surface contact.

The cam element can also be made smaller. The production of plastic cam elements or camshafts produced completely from plastic, for example by injection molding, can also likewise be implemented. The use of other lightweight construction materials for the production of the camshafts or cam elements, for example aluminum, also becomes possible. On account of the reduction in mass and of sliding lubrication, fuel savings of 5% and more are to be expected.

Particularly when valve actuators are actuated jointly, a weak spring may be provided for acting upon each closed valve.

Other features which are considered as characteristic for the invention are set forth in the appended claims.

Although the invention is illustrated and described herein as embodied in a valve mechanism, in particular for internal combustion engines of motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows integral parts of a first version of a valve mechanism in an oblique view, FIGS. 2 to 4 show various angular positions of the first version of the valve mechanism in cross section, FIGS. 5 and 6 show longitudinal sections through the first version, FIG. 7 shows a longitudinal section through a second version of a valve mechanism, FIG. 14 shows integral parts of a fifth version in an oblique view, FIG. 15 shows a longitudinal section through the fifth version, FIG. 16 shows a cross section through the fifth version, FIG. 21 shows integral parts of a sixth version in an oblique view, FIG. 22 shows a longitudinal section through the seventh version, FIG. 34 shows integral parts of a twelfth version in an oblique view, FIG. 35 shows a cross section through the twelfth version, FIG. 36 shows an enlarged illustration of a detail from FIG. 35, FIG. 37 shows an oblique view of the twelfth version.

DESCRIPTION OF THE PREFERRED EMBODIMENTS

Figure 8:
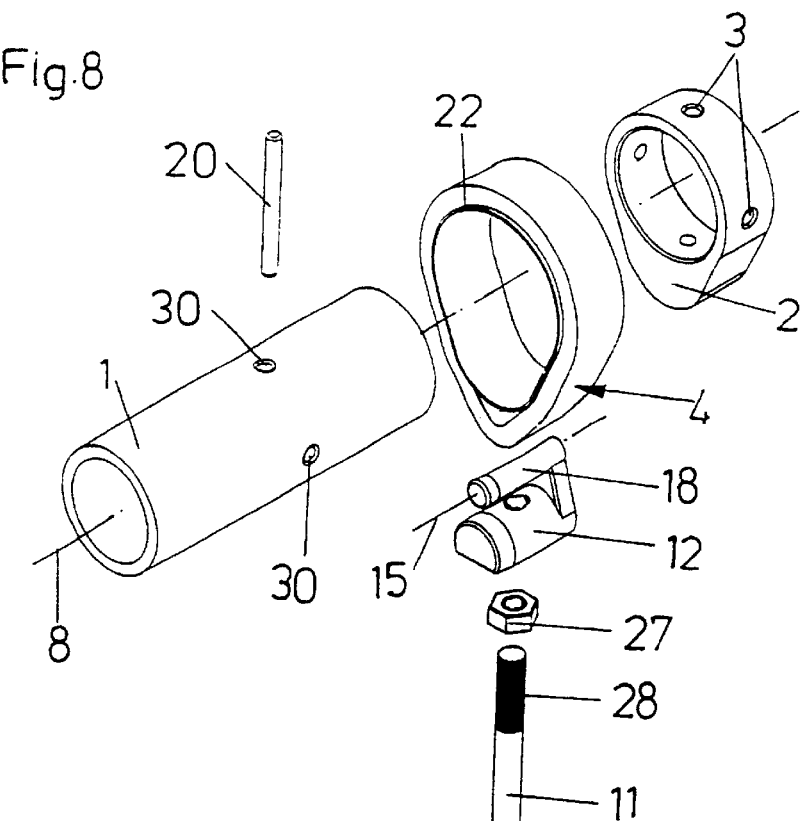
FIG. 8 shows integral parts of a third version of a valve mechanism in an oblique view.
Figure 9:
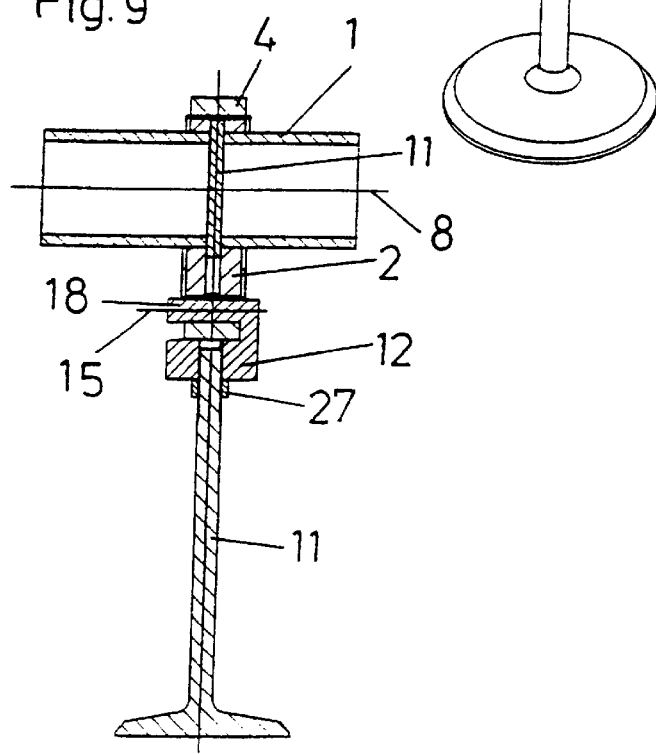
FIG. 9 shows a longitudinal section through the third version.
Figure 10:
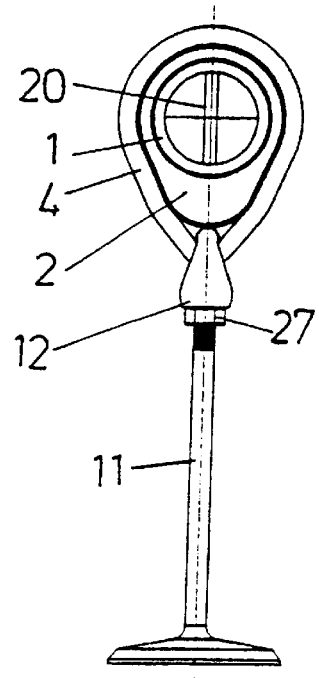
FIG. 10 shows a side view of the third version.

The drawings each show only one valve mechanism, a valve mechanism used for an internal combustion engine of a motor vehicle having, on the carrier shaft 1, the number of cam elements 2 which is required for the valves. An oil supply to build up an oil film or a supply of compressed air to build up an air cushion on the circumferential surface of the cam element 2 can take place via a hollow carrier shaft, radial orifices 30 in the carrier shaft 1 and via bores 3 in the cam element 2. As shown in FIGS. 8 to 10, the furniture of orifices 30 and bores 3 may in this case also be used for fastening the cam element 2 on the carrier shaft 1 when a fixing pin 20 is inserted.

The cam element 2 is surrounded by a surround element 4 which comes to bear essentially on the circumferential surface and which consists of a flexible, resilient and, if appropriate, also elastic material, so that the cam element 2 can rotate about its axis of rotation 8 in the surround element 4 along with the continuous pulsating deformation of the surround element 4. The cross-sectional shape of the surround element 4 is illustrated in the figures as being matched in each case to the cam element 2, since the valve mechanism is shown in an exploded illustration here. As an individual element, the surround element 4 is in the shape of a ring solely when the material has sufficient elasticity and thickness, whereas it otherwise forms a collapsed oval or the like. The surround element 4 is prevented from rotation by connection to a valve actuator 10 which, in the case of the valve tappet, is mounted displaceably in a sliding bearing 41 (FIG. 30) and, in the case of a rocker arm or drag lever, is mounted pivotably in a pivot bearing. This also permits a version wherein a sliding medium or lubricant is supplied through the stationary surround element 4. The surround element 4 is connected to the valve actuator 10 tiltably or pivotably about an axis 15, so that, when the cam of the cam element 2 passes through the region of connection of the valve actuator 10, a pivoting of the surround element 4 in relation to the valve actuator 10 becomes possible. This is necessary since, as shown in FIGS. 2 to 4, the sliding bearing of the valve shank 11 does not allow any lateral deflection, and the valve shank 11 has to stand in a radial orientation to the axis of rotation 8. The valve stroke is also evident from a comparison of FIGS. 2 to 4. In the first version according to FIGS. 1 to 6, the surround element 4 is formed by a ring which consists of a flexible and, if appropriate, slightly elastic plastic and which has only low deformation resistance.

The ring contains, at one point, an aperture 5, wherein a bearing pin 14 running parallel to the axis of rotation 8 of the cam element 2 passes through the valve shank 11. On the ring inner surface surrounding the cam element 2 is provided a closed thin loop of a band 22 of metal, a low-friction, if appropriate fiber-reinforced plastic, a fabric or the like, wherein the cam element 2 rotates. As shown in FIGS. 5 and 6, a small gap 31, wherein an oil film can be formed for sliding lubrication, remains, generally simply as a consequence of assembly, between the band 22 and the circumferential surface of the cam element 2. Furthermore, the oil film also has an impact- and noise-damping effect and, as may be gathered from a comparison of FIGS. 5 and 6, may also be used for acting upon the closed valve disk when, in the valve closing position, the surround element 4 lies eccentrically to a minimal extent, so that the thickness 31, 31" of the gap is smaller in the cam region and larger in the base-circle region, and the oil pressure attempts to compensate the thickness difference which corresponds to the difference between the axis of rotation 8 and the corresponding axis 8 of the surround element 4.

FIG. 7 shows a version wherein the surround element 4 has a plurality of turns 7 of a band which may consist, for example, of a number of closed loops (similar to that of the band 22 in FIG. 1) lying one in the other and made of spring steel, or a strip composed of threads in a textile weave or the like, or which is wound spirally and may likewise consist of a metal band, a fabric band or the like. In this version, a bearing pin 18 of a preferably two-part holder 12, which carries two valve actuators 10 of identically switched valves, engages between two turns 7 of the surround element 4. Also illustrated here is action with the aid of a spring 26 which takes effect not for returning the valve actuators 10 into the base-circle region, but only for acting upon the closed valve.

FIGS. 8 to 10 show a version wherein the holder 12 is designed in the form of a "smoothing iron", the bearing pin 18 being arranged between a band 22 and a surrounding body 4 made of plastic or the like, similar to FIG. 1, and forming the axis 15. The end portion of the bearing pin 18 widens slightly, in order to prevent slipping out of place axially in the surround element 4, the opposite region of the holding body 12 being beveled so that the holding body 12 can be pushed in laterally. The holding body 12 has a threaded bore, into which the valve shank 11 having a thread 28 can be screwed and can be fixed adjustably by means of a lock nut 27. As mentioned, FIGS. 8 to 10 also show a possible fixing of the cam element 2 on the carrier shaft 1 by means of a pin 20 which is inserted through bores 30 of the shaft 1 and bores 3 of the cam element 2.

Figure 11:
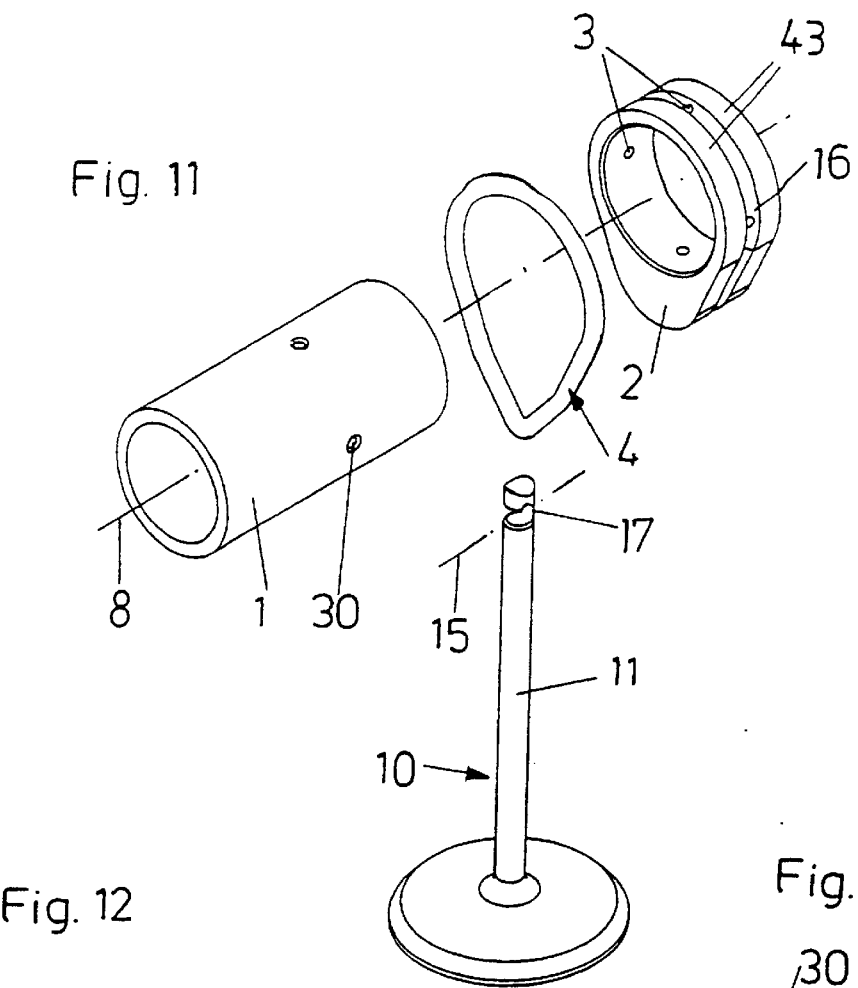
FIG. 11 shows integral parts of a further version of a valve mechanism in an oblique view.
Figure 12:
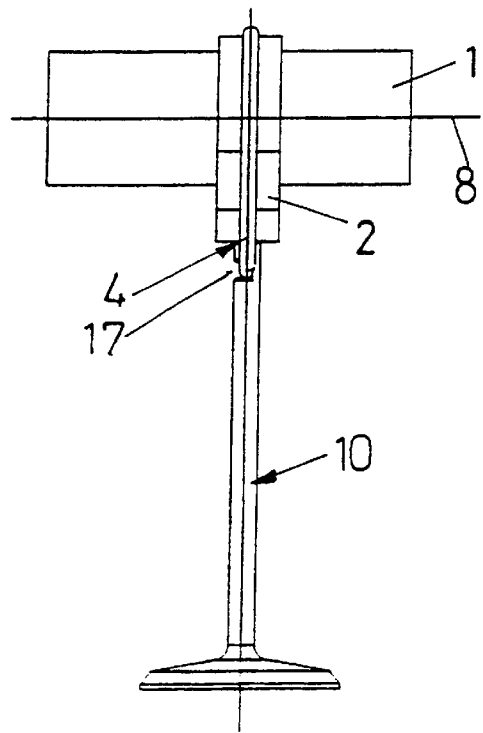
FIG. 12 shows a side view of the fourth version.
Figure 13:
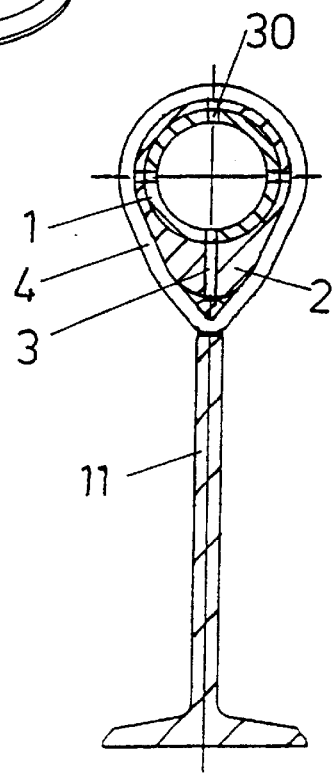
FIG. 13 shows a cross section through the fourth version.

FIGS. 11 to 13 show a version wherein the surround element 4 is formed by a closed rope loop which is arranged slideably in a groove 16 in the circumferential surface of the cam element. The cam element is divided into two cam regions 43 spaced axially from one another, the groove 16, wherein the oil bores 3 of the cam element 2 issue, forming the middle region. The valve shank 11 of the valve actuator 10 is provided with an, in particular, laterally open hook-like lug 17, wherein the rope loop is suspended, and is rounded, parallel to the axis 15, on the top side, in order to allow pivoting, as is evident, above all, from FIG. 13. The lug 17 may also be designed closed, if a piece of a rope is closed to form the rope loop only after being slipped into the lug 17. The rope may be a wire rope, a plastic rope, etc.

Figure 17:
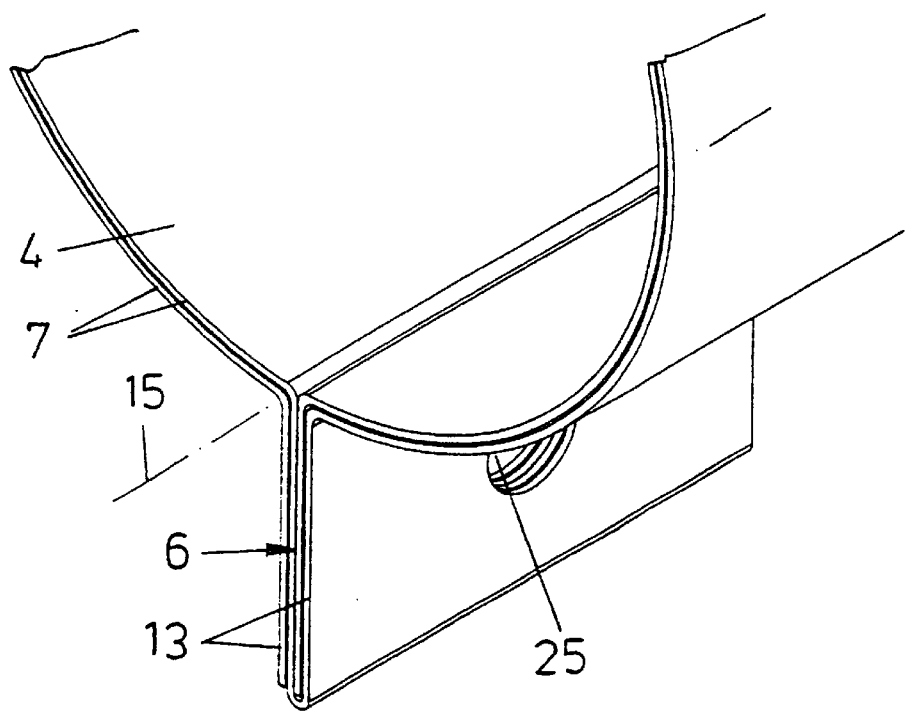
FIG. 17 shows an enlarged illustration of a detail from FIG. 14.

FIGS. 14 to 17 show a version wherein the surround element 4 is formed from a band or strip composed of a titanium-alloyed spring steel, a sheetlike structure produced from aramid fibers and having a textile weave, in particular a fabric or the like. For connection to the valve actuator 10, a protuberance 6 of the surround element 4 is performed, which can be inserted into a slot 29 of the valve shank 11. The connection is made by means of a cotter 19 which passes through bores 25 of the valve shank 11 and the protuberance 6 (FIG. 17). The surround element 4 may be a single closed loop or turn with a protuberance 6 pressed flat. The single loop or turn may also be formed by combining the two ends 13 of a band which, lying against one another, produce the protuberance 6 and are inserted jointly into the slot 29. However, as shown in detail in FIG. 17, the surround element may also have two turns 17 and be wound "spirally" from one piece. In this version, too, the two ends 13 preferably terminate in the protuberance 6. In this version, the axis 15 is not implemented physically, but is obtained by the bending region between the protuberance 6 and that part of the surround element 4 which surrounds the circumferential surface of the cam element 2.

Figure 18:
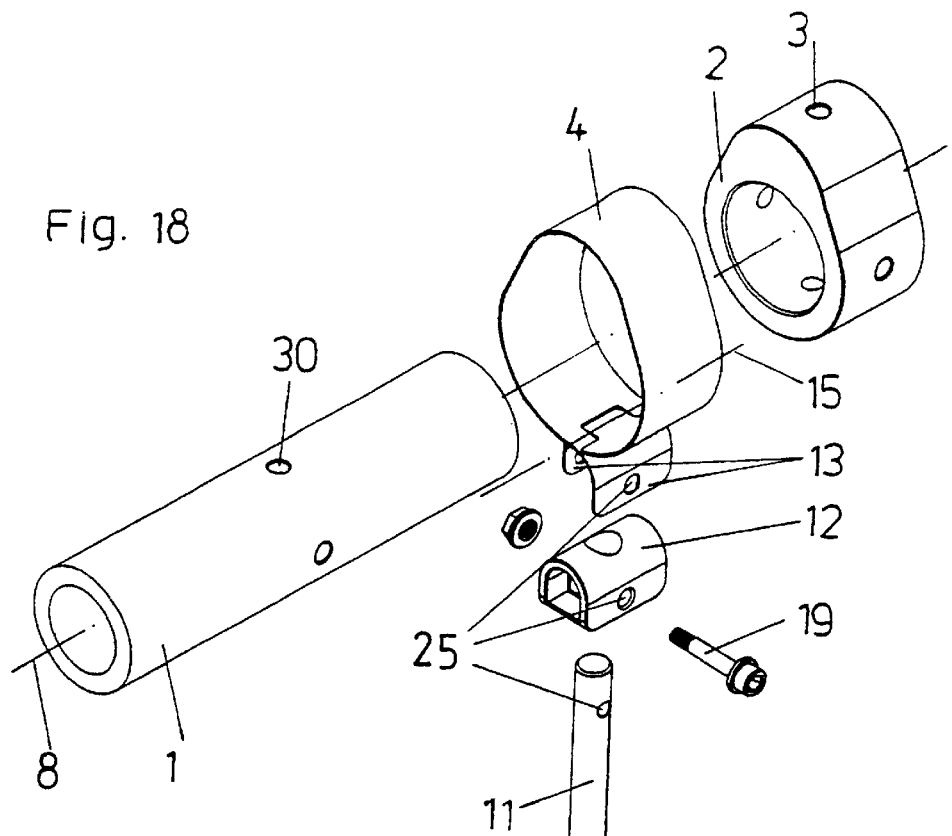
FIG. 18 shows integral parts of a sixth version in an oblique view.
Figure 19:
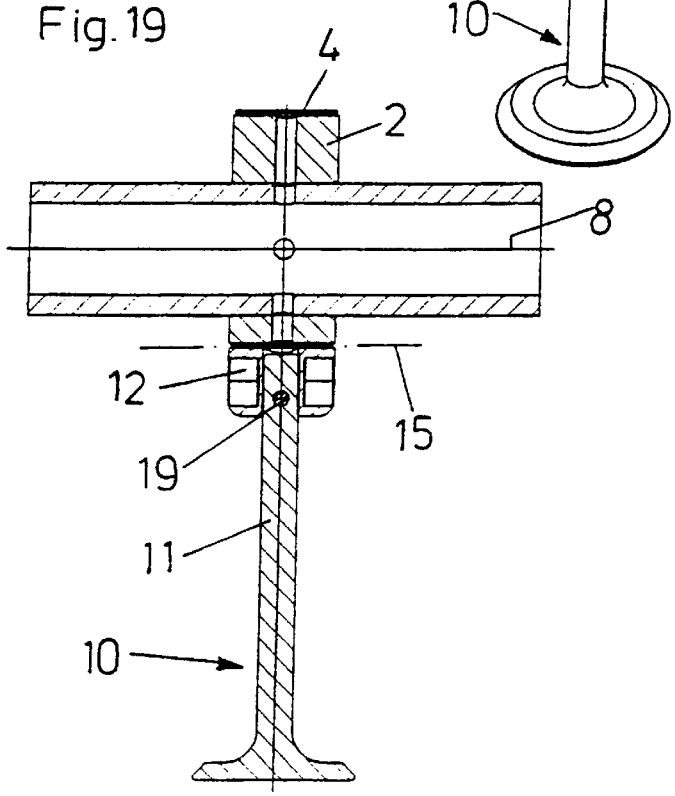
FIG. 19 shows a longitudinal section through the sixth version.
Figure 20:
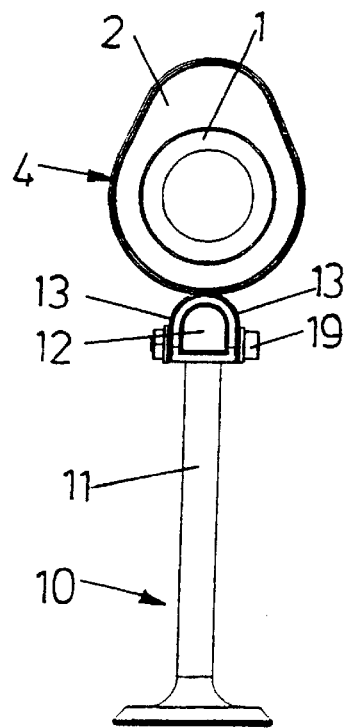
FIG. 20 shows an end view of the sixth version.

FIGS. 18 to 20 show a similar version, wherein the surround element 4, again formed by a band spring, a fabric band or the like, is designed as an open loop, has a single turn 7 and is connected with its free ends 13 to the holder 12 of the valve actuator 10. The two ends 13 are cut in or cut out so as to form tongues which are capable of being inserted one into the other and wherein bores 25 are again provided. The ends 13 are bent relative to one another and are led on both sides round the holder 12. A cotter or pin 19 passes through the two ends 13, the holder 12 and the end of the valve shank 11 inserted into the holder 12. The holder 12 is curved on the top side, as can best be seen from FIG. 20, so that the relative pivoting of the surround element in relation to the valve actuator 12 is possible during the passage of the cam region. The axis 15 is again not produced physically, but lies in the penetration of the ends 13, the large radii of curvature ensuring a long useful life. The ends 13 could also each have a laterally open incision extending from one edge to halfway and be inserted one into the other from the side.

FIGS. 21 and 22 show a version wherein the surround element 4 (in a similar way to FIG. 7) consists of a relatively large number of turns 7 formed by individual closed loops which can be inserted one into the other and therefore have increasing sizes. The innermost loop, which is illustrated on the left in FIG. 21, surrounds the circumferential surface of the cam element 2. The further loops each have an orifice 9, the diameter of the orifices 9 decreasing from the inside outward, that is to say from the second smallest to the outermost largest loop. The orifices 9 brought into congruence with one another thereby supplement one another to form a frustoconical, outwardly narrowing receiving orifice for the frustoconical holder 12 of the valve actuator 10. The holder consists of two parts 12' which supplement one another and between them hold the head 34 of the valve actuator 10, said head being of spherical design and allowing a movement of the surround element 4 about the axis 15. The set of turns 7 of the surround element 4 is held on the cam element 2 by two axially adjacent closing disks 33, and in each case a slight gap, wherein an oil film can likewise form, remains between the surround element 4 and the closing disks 33. The closing disks 33 may be connected to the cam element 2 or else, as illustrated, be secured axially by sleeves 32 which in each case are pushed onto the carrier shaft 1 in the interspace with an adjacent cam element or bearing element.

Figure 23:
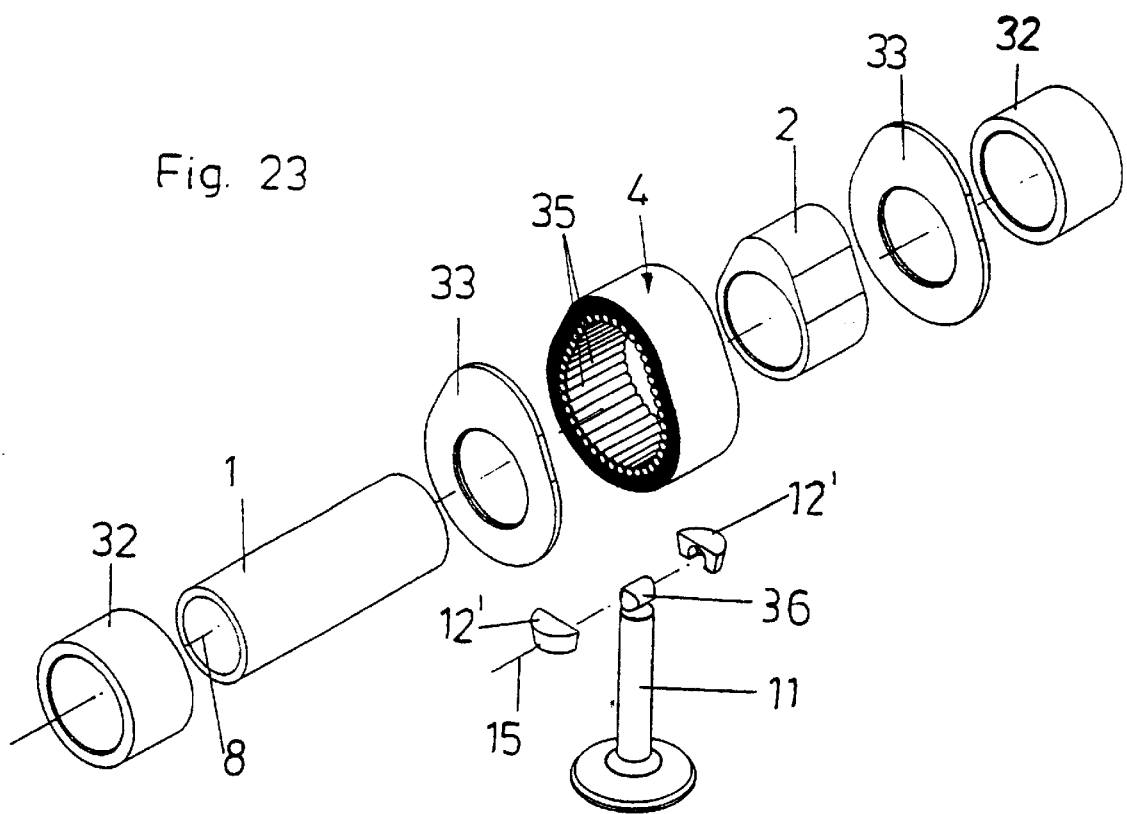
FIG. 23 shows integral parts of an eighth version in an oblique view.
Figure 24:
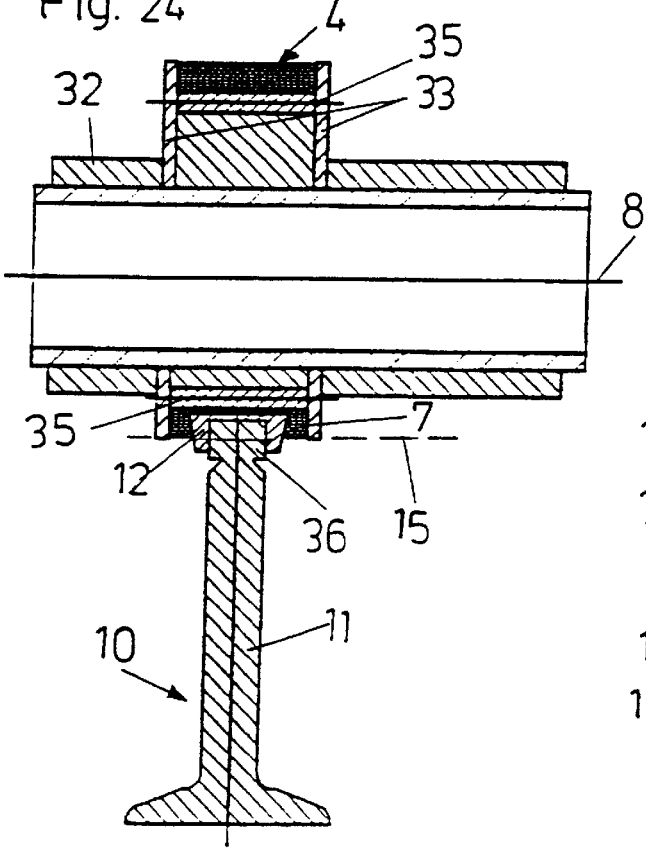
FIG. 24 shows a longitudinal section through the eighth version.
Figure 25:
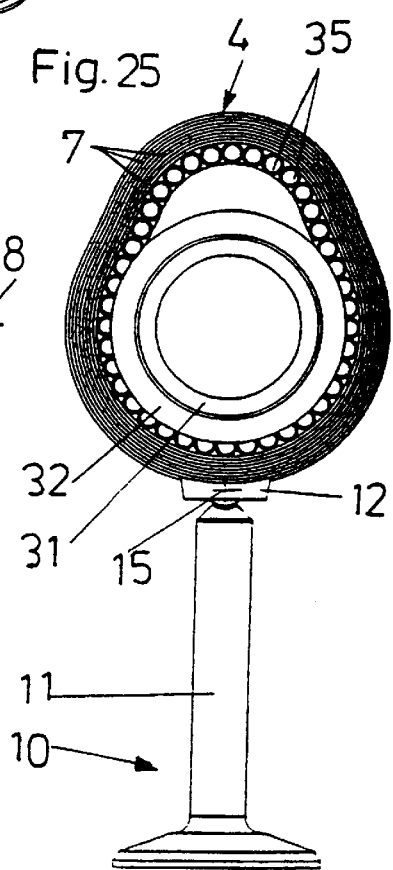
FIG. 25 shows an end view of the eighth version.

In the version according to FIGS. 23 to 25, the surround element 4 likewise has a plurality of turns 7 which, however, are formed not by individual closed loops, but by a spiral winding of a single piece of band, here, too, the outer turns having bores of different diameter which, according to FIG. 24, supplement one another to form the conically narrowing receiving orifice for the holders 12. The two parts 12' of the holder receive the head 36 of the valve actuator 10, said head, in this version, being curved part-cylindrically about the axis 15. In this version, in the surround element 4 a rolling bearing is formed, having rollers 35 which are lined up with one another and roll on the circumferential surface of the cam element 2. Although not illustrated, in this version, too, an oil supply through bores 30, 3 from the carrier shaft 1 or through the surround element 4 from outside is preferably provided. The rollers 35 are held axially by the closing disks 33, the closing disk 33 having been omitted in the end view of FIG. 25 for the sake of clarity.

Figures 26, 27, 28:
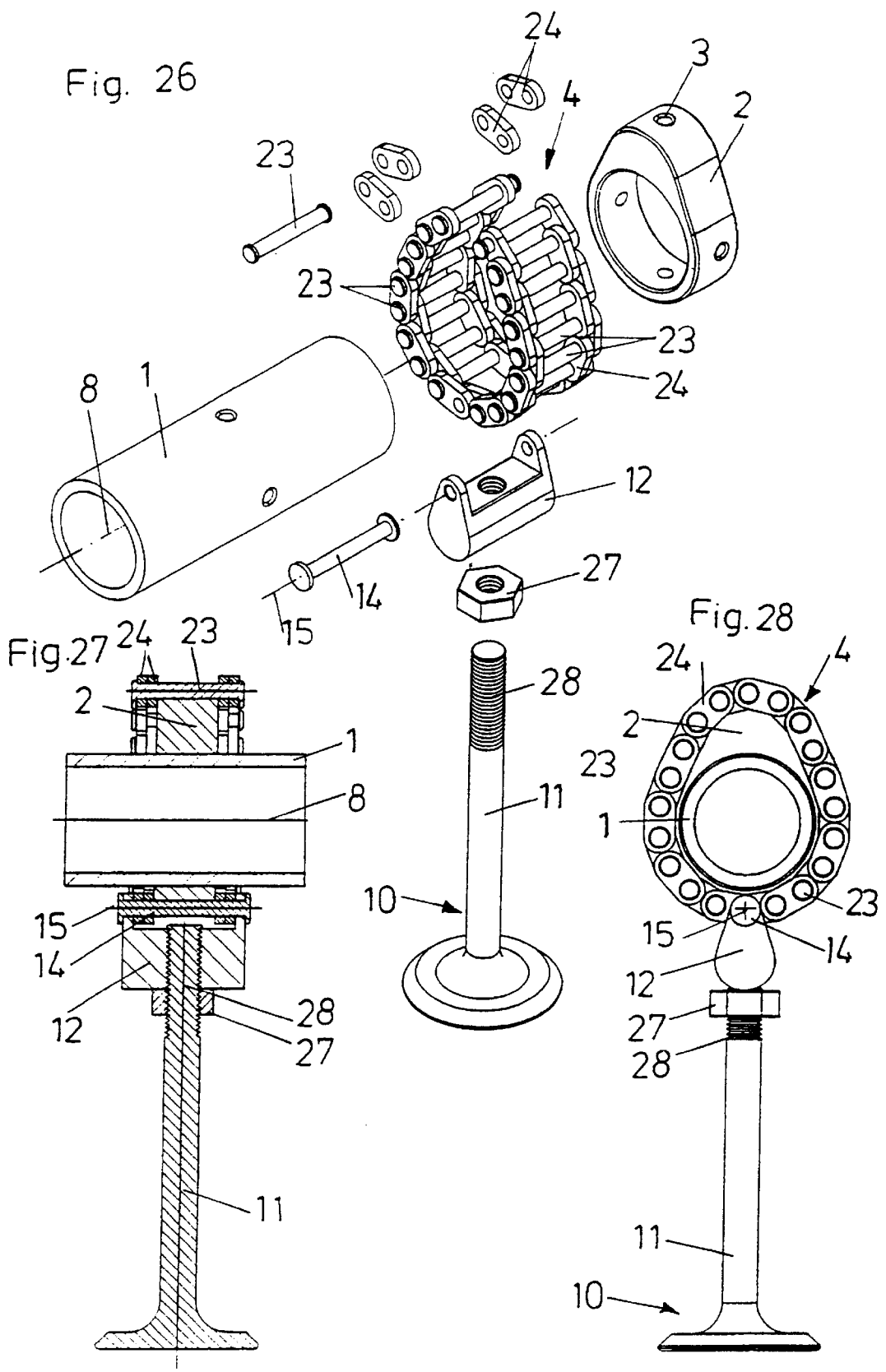
FIG. 26 shows integral parts of a ninth version in an oblique view.
FIG. 27 shows a longitudinal section through the ninth version.
FIG. 28 shows an end view of the ninth version.

A further version is shown in FIGS. 26 to 28. In this, the surround element 4 is formed by a roller chain, the joint pins 23 of which laterally connect plates 24 which also have the effect of axial guidance on the cam element 2 engaging between the plates 24. One joint pin is lengthened and forms the bearing pin 14 for the fork-shaped holder 12 of the valve actuator 10, the valve shank 11 being screwed adjustably in said holder and being fastened by means of the counternut 27.

Figure 29:
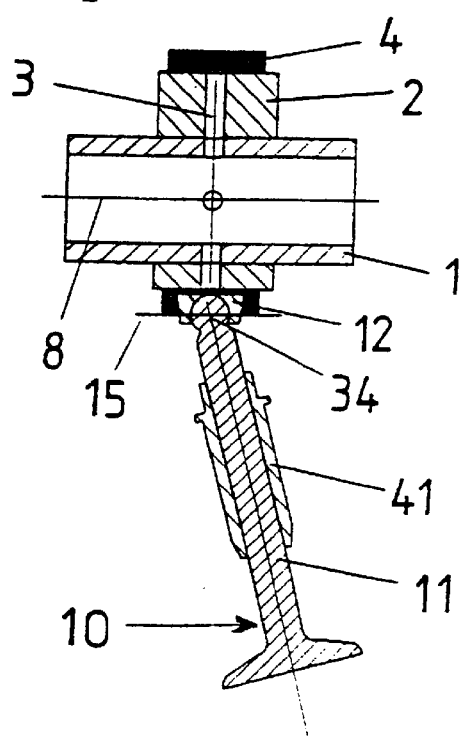
FIGS. 29 and 30 show longitudinal sections through a tenth version in two different positions.
Figure 30:
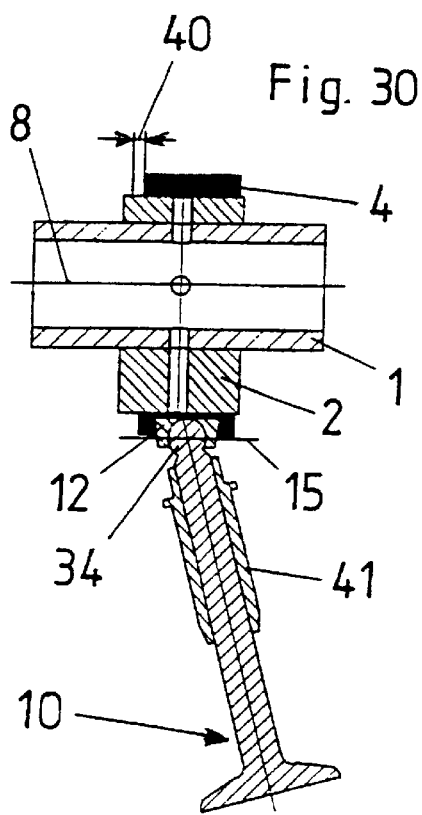

FIGS. 29 and 30 illustrate a version which corresponds essentially to FIGS. 21 and 22, but wherein the valve actuator 10 in the form of a valve tappet is not arranged perpendicularly to the axis of rotation 8, but has an inclination to the latter. In this version, too, the axis 15 about which the surround element 4 pivots on the valve actuator 10 is parallel to the axis of rotation 8. The linear movement of the valve shank 11 in a sliding bearing 41 fixed to the housing or placed in a fixed location generates, in the region of connection to the surround element 4, a movement component in the direction of the axis of rotation 8. The surround element 4 is therefore displaceable on the cam element 2 in the direction of the axis of rotation 8 by the amount of the distance 40. If appropriate, the holder 12 may also be arranged displaceably on the surround element 4.

Figure 31:
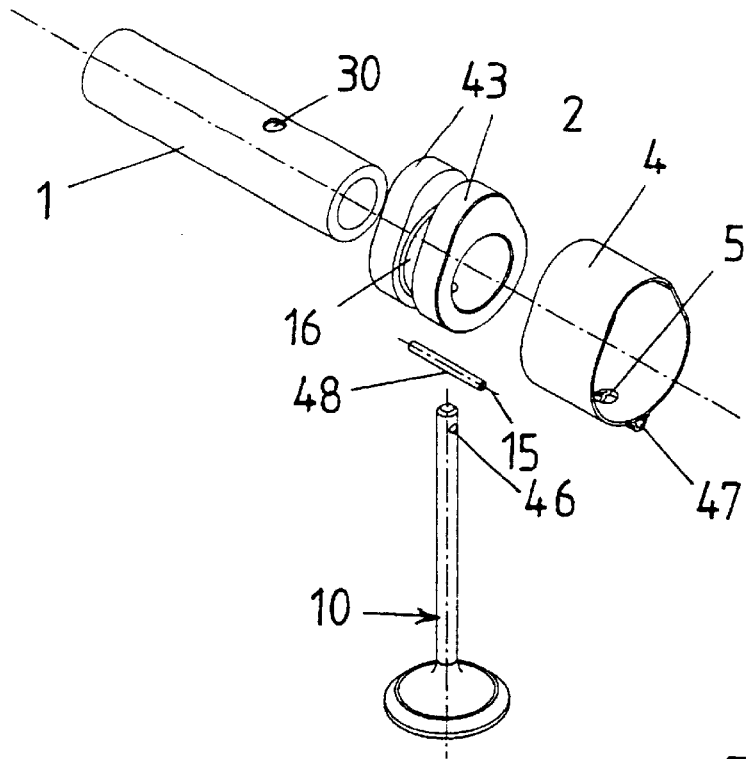
FIG. 31 shows integral parts of an eleventh version in an oblique view.
Figure 32:
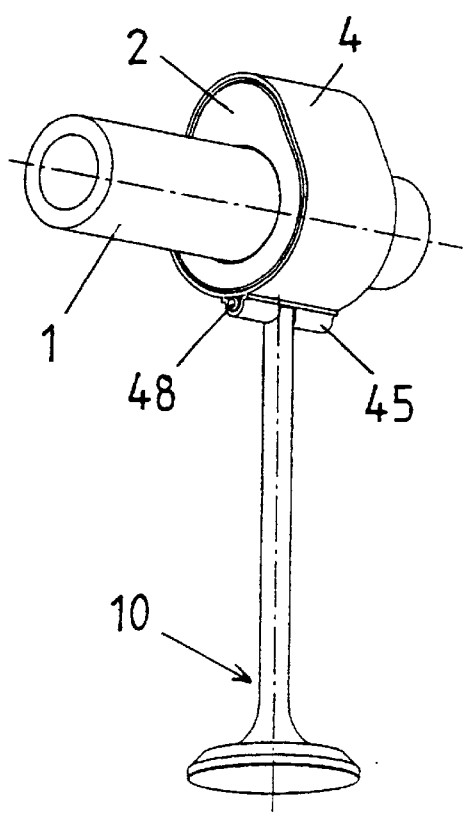
FIG. 32 shows an oblique view of the eleventh version.
Figure 33:
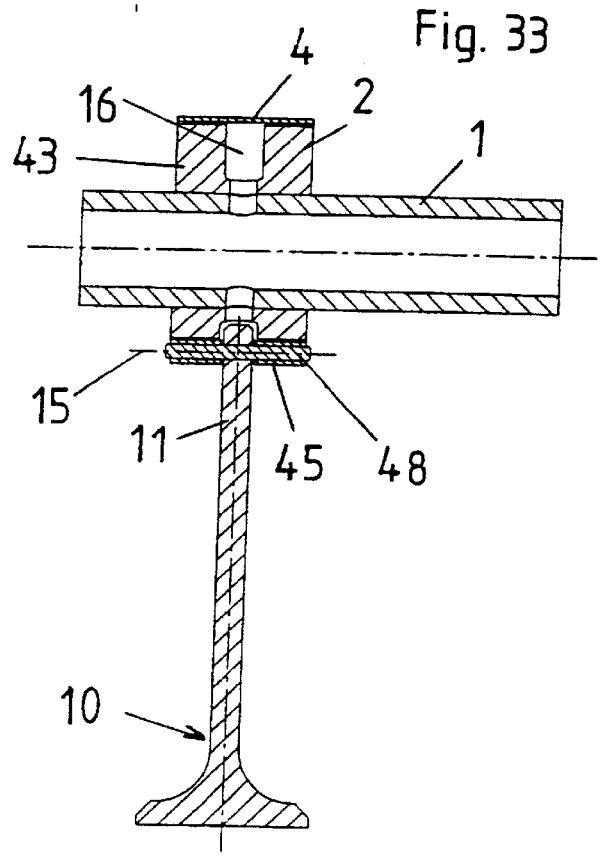
FIG. 33 shows a longitudinal section through the eleventh version.

In the version according to FIGS. 31 to 33, the cam element 2 is provided with a circumferential groove 16, the bottom of which is concentric to the carrier shaft 1. The cam element 2 is thereby subdivided into two cam regions 43 which are connected via a material-saving middle region. The surround element 4, which, in this version, is formed by a closed loop of a band or strip, has at one point an adhesively bonded or stitched tab 45 which defines an insertion orifice 47. The loop and the tab 45 are provided in the middle region with an aperture 5. The valve actuator 10 has a bore 46 in the fastening region, so that, after insertion into the aperture 5, a connecting element 48 in the form of a pin or cotter can be pushed through the insertion orifice 47 and the bore 46. The pin again forms the axis 15 which extends parallel to the carrier shaft 1. The free end of the valve shank 11 in this case projects into the circumferential groove 16, with the result that axial guidance is also provided. The band of the surround element 4, said band being produced preferably by a textile circular technique (circular weaving, circular knitting or the like), contains, above all, aramid threads or fibers and is preferably a seamless fabric ring or the like wherein at least the weft threads consist of an aramid. The fabric may also have a low-friction coating.

FIGS. 34 to 37 show a similar version, wherein a circular-worked band, in particular circular-woven or such like band, is again likewise used for producing the surround element 4. The band circumference corresponds essentially to double the circumference of the cam element 2 and is folded together to form a two-ply open loop. The reversal points of the band at the ends 13 of the open loop even form the insertion orifices 47 for the hollow connecting element 48 which, in this version, is bent in a U-shaped manner. The two ends 13 are cut out in the middle region 52, and the two cutouts supplement one another to form the aperture 5, through which the end of the valve shank 11 projects into the circumferential groove 16 of the cam element. The mounting position of the valve actuator 11 can thereby lie, offset laterally, parallel to the axial plane, as is evident from FIG. 35, as a result of which advantages in terms of a variation in the roll and contact lines may be afforded. The valve shank 11 may, of course, also lie in the axial plane, as a consequence of which the two insertion orifices 47 are not symmetric. A second part 53 bent in a U-shaped manner is inserted into the hollow connecting element 48 and, for example, adhesively bonded, so that the connection between the surround element 4 and the valve actuator 10 is secured.

Instead of by means of the U-shaped connecting element 48, the two ends 13 of the open loop could also be connected by means of a buckle-like element having one or more slots, through which the ends 13 are guided and are fixed by means of pins inserted into their insertion orifices 47. The buckle-like element constitutes the holder 12 for the valve actuator, into which holder the latter is screwed or latched.

Figure 38:
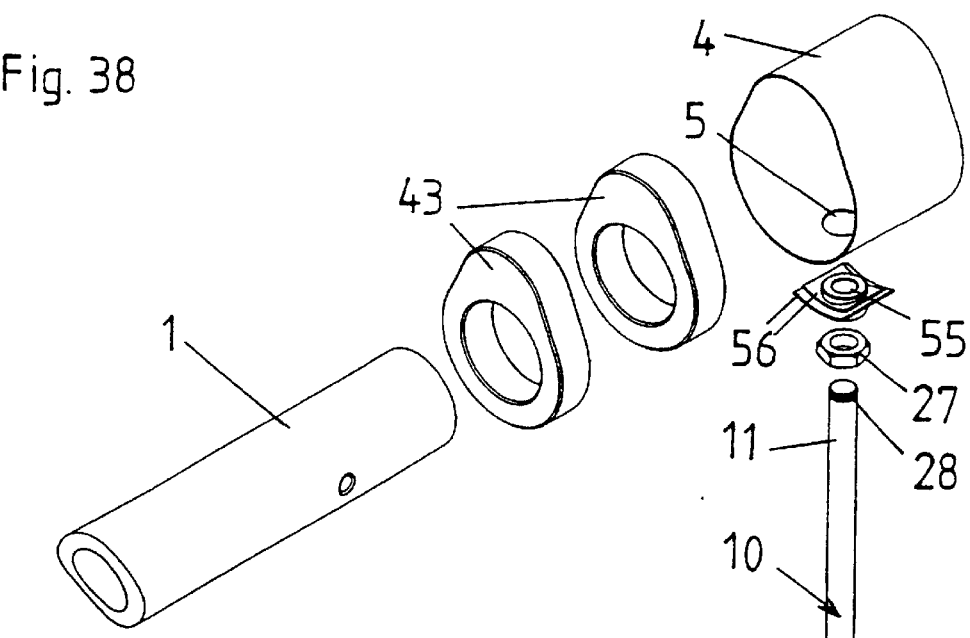
FIG. 38 shows integral parts of a thirteenth version in an oblique view.
Figure 39:
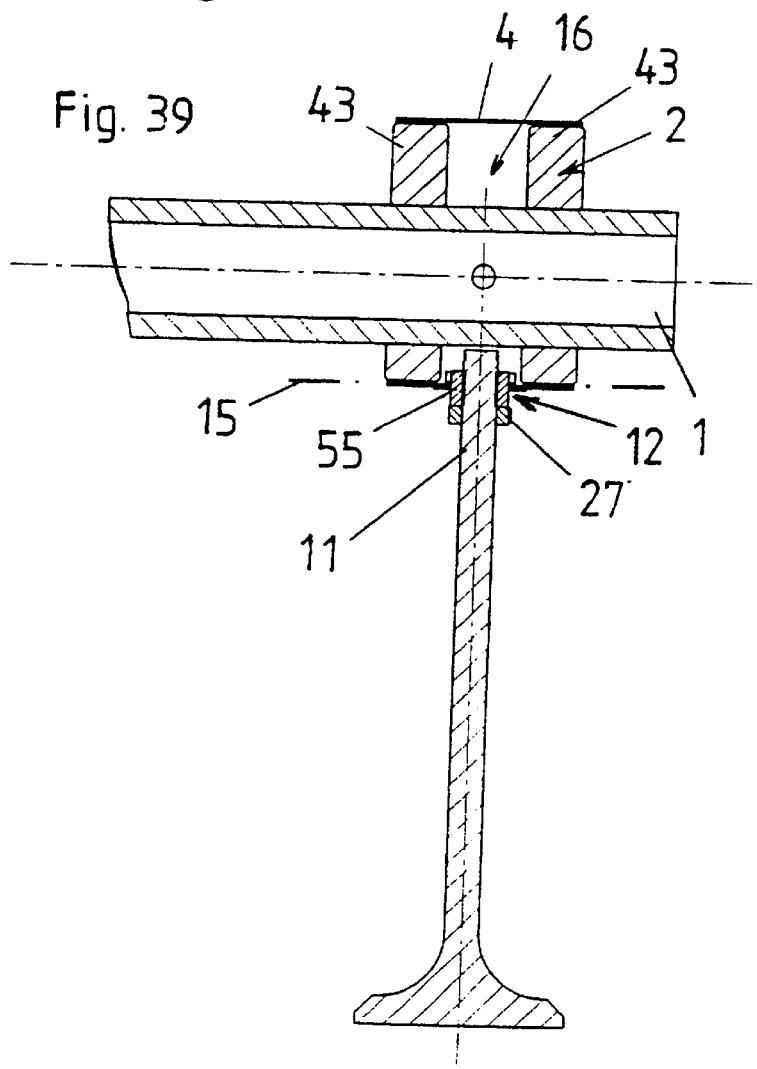
FIG. 39 shows a longitudinal section of the thirteenth version.

In the version according to FIGS. 38 and 39, a sleeve 55 provided with a pair of connecting tabs 56 is inserted into the aperture 5 of the surround element 4 formed by a closed loop and projects inward into the circumferential groove 16. The connecting tabs 56 are adhesively bonded, welded or the like to the surrounding region of the aperture 5. The valve shank 11 has a thread 28 at the free end and can be screwed to an adjustable depth into a thread of the sleeve 55 and braced by means of a counternut 27. The cam element 2 consists, in this version, of two cam regions 43 which are not connected to one another, but are fixed separately on the carrier shaft. Instead of the screw connection, a latching or snapping connection could be made between the sleeve 55 and the valve shank 11, so that rotation about the axis of the valve shank 11 is possible. In this version, the surround element 4 may be a fabric band in a similar way to FIG. 31 or a band spring in a similar way to FIG. 21. The axis 15, about which the surround element 4 has to pivot to and fro to a limited extent in relation to the valve actuator 10, runs between the connecting tabs 56 by virtue of the flexibility of the material used.

In the versions according to FIGS. 40 to 46, the surround element 4 is in each case produced in a closed loop with a protuberance 6 which is divided off from the cam element 2 by an adhesively bonded, stitched or clamped constriction and which receives an insert 54 serving as a holder 12 of the valve actuator 10.

Figure 40:
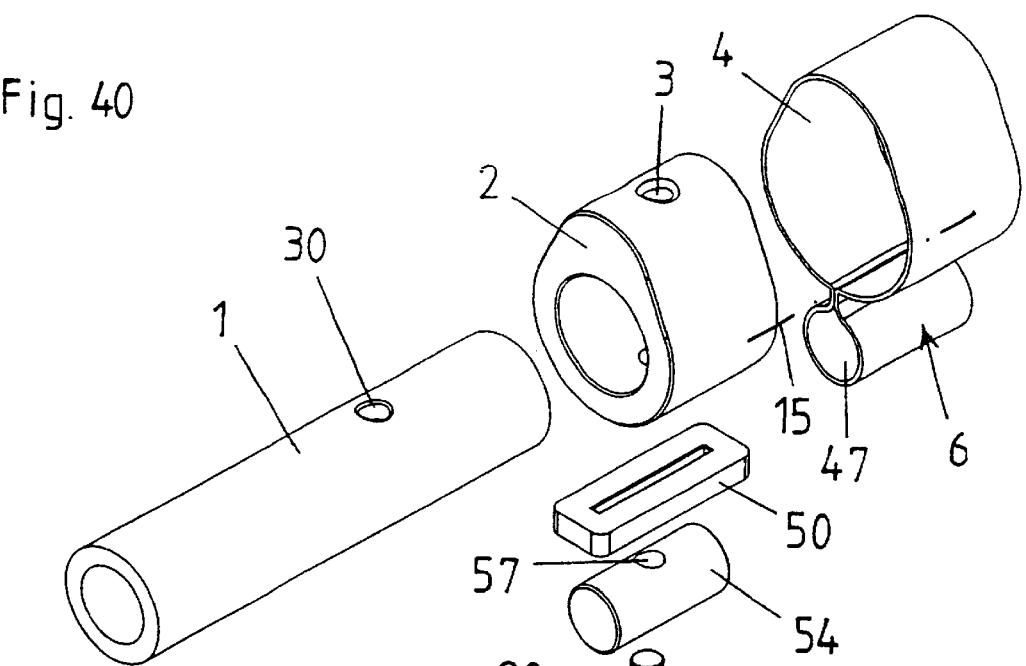
FIG. 40 shows integral parts of a fourteenth version in an oblique view.
Figure 41:
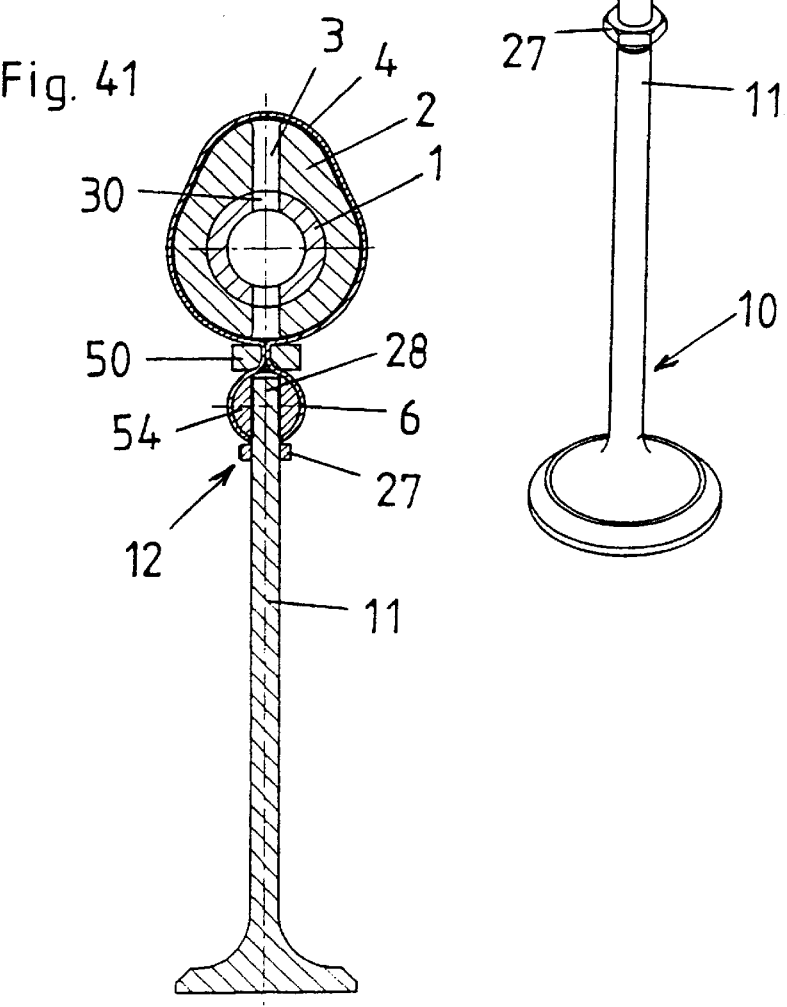
FIG. 41 shows a cross section through the fourteenth version.

FIGS. 40 and 41 show a version wherein the constriction of the surround element 4 is obtained by means of a flat lug 50, through which the protuberance 6 pressed flat is slipped. The insert 54 pushed into the protuberance 6 has a latching or threaded bore 57, into which the latchable or threaded end 28 of the valve shank 11 can be pushed or screwed. In the latter case, a counternut 27 again serves for adjusting or fixing the length of the valve actuator 10.

Figure 42:
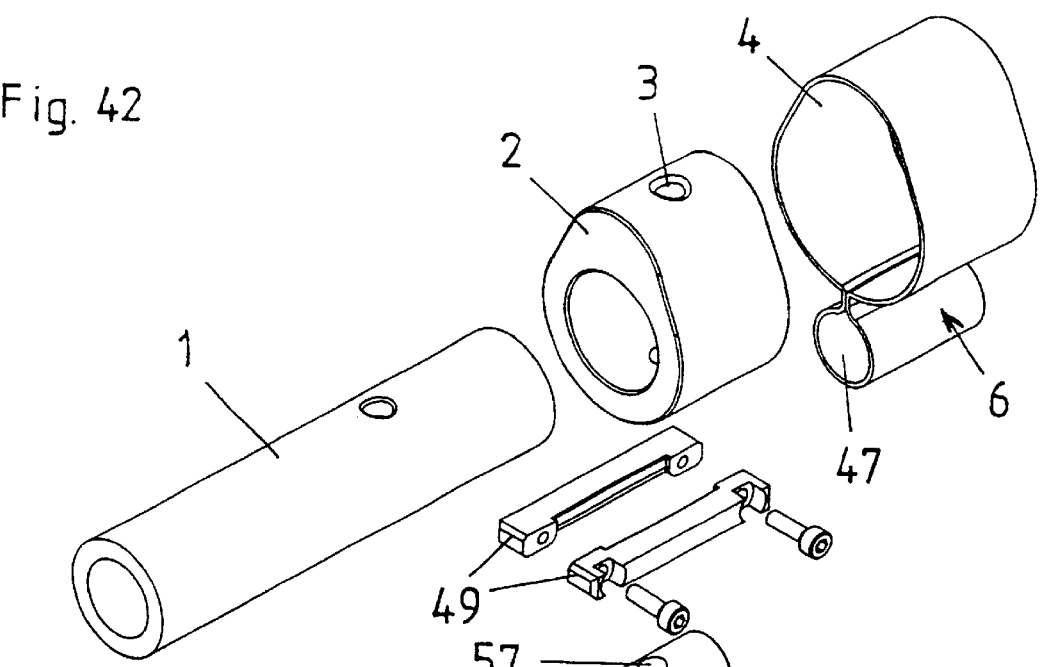
FIG. 42 shows integral parts of a fifteenth version in an oblique view.
Figure 43:
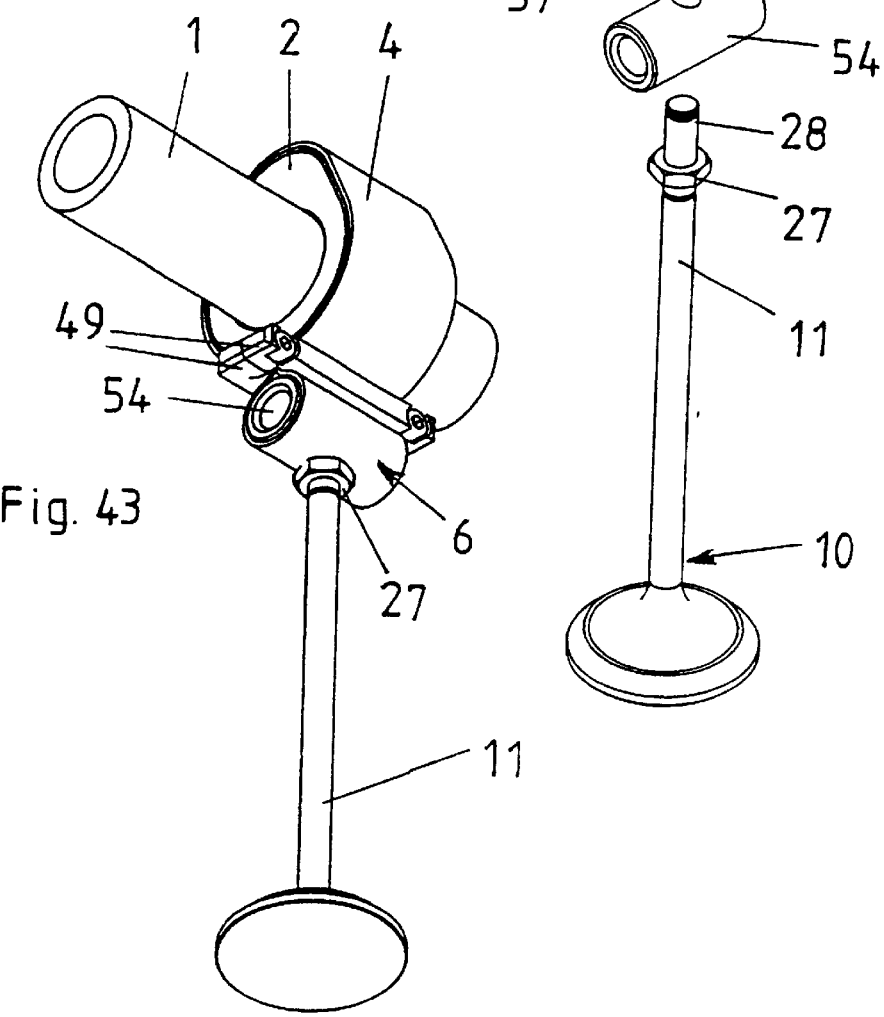
FIG. 43 shows an oblique view of the fifteenth version.

FIGS. 42 and 43 show an identical connection to the surround element 4 and the valve actuator 10, wherein connection the constriction of the protuberance 6 is obtained by means of two clamping jaws 49 capable of being braced relative to one another. The two clamping jaws 49 may also be designed identically, so that, in each case, a connecting screw is inserted into a clamping jaw 49.

Instead of the lug 50 or the clamping jaws 49 in the versions of FIGS. 40 to 43, a latchable constricting device may also be envisaged, for example by two identically designed parts provided with latching hooks and latching orifices being snapped together with one another.

Figure 44:
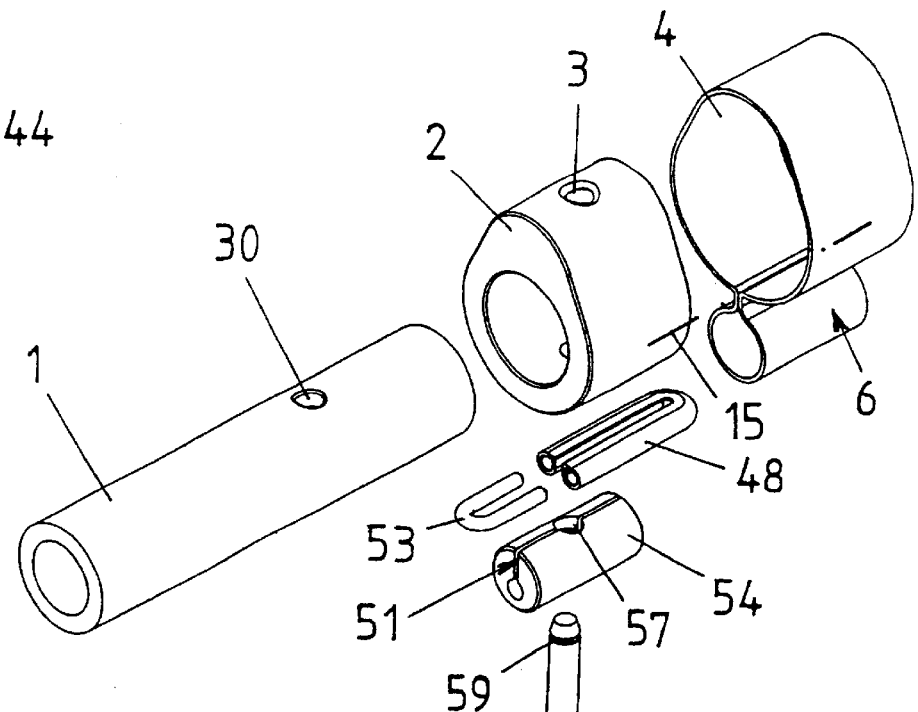
FIG. 44 shows integral parts of a sixteenth version in an oblique view.
Figure 45:
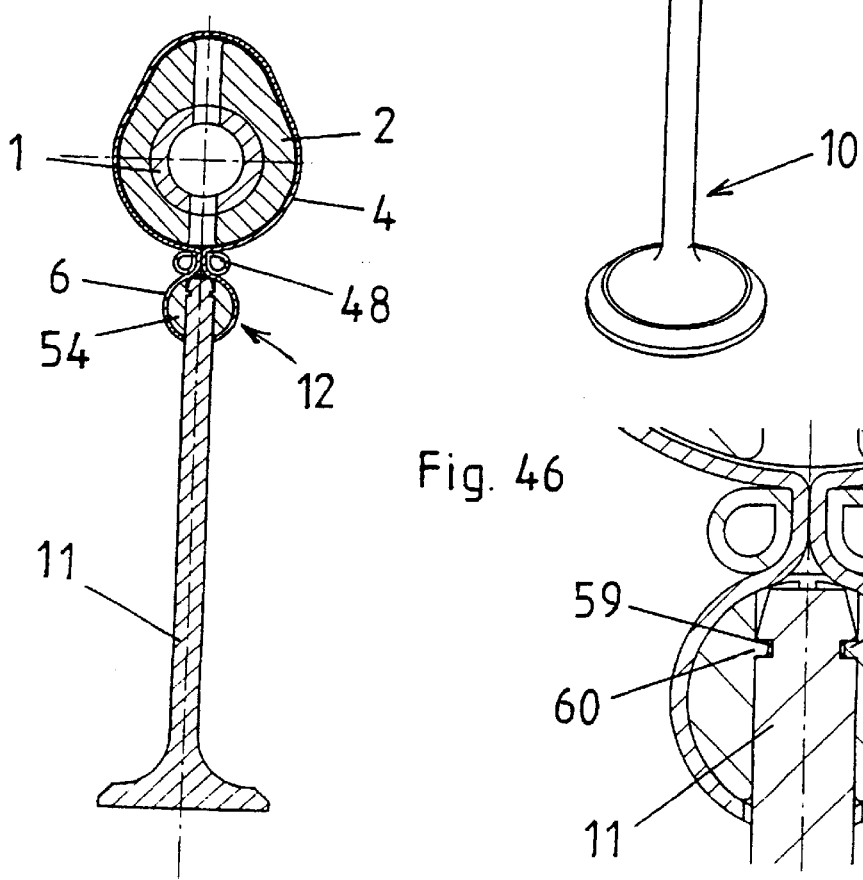
FIG. 45 shows a cross section through the sixteenth version.
Figure 46:
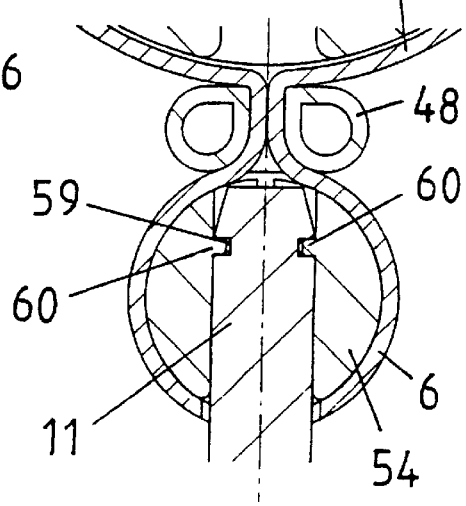
FIG. 46 shows an enlarged illustration of a detail from FIG. 45.

FIGS. 44 and 45 show one possibility for a latching connection between the valve shank 11 and the holder 12, allowing the valve shank 11 to rotate about its axis. The end of the valve shank 11 is provided with an angular, conical or rounded annular groove 59, and the insert 54 is provided with two webs which are resilient by virtue of a slot 51 and on which angular, conical or rounded ribs 60 are formed. The valve shank is pushed into the bore 57, the insert 54 widening at the same time, until the ribs 60 latch into the annular groove 59. The connecting element 48 causing the constriction and taking the form of a U-shaped hollow shackle is subsequently pushed on and secured by means of the U-shaped counterpiece 53 which is adhesively bonded in or pinched. In each of FIGS. 40 to 46, the constriction forms a bendable connection wherein the axis 15 is implemented.

Figure 47:
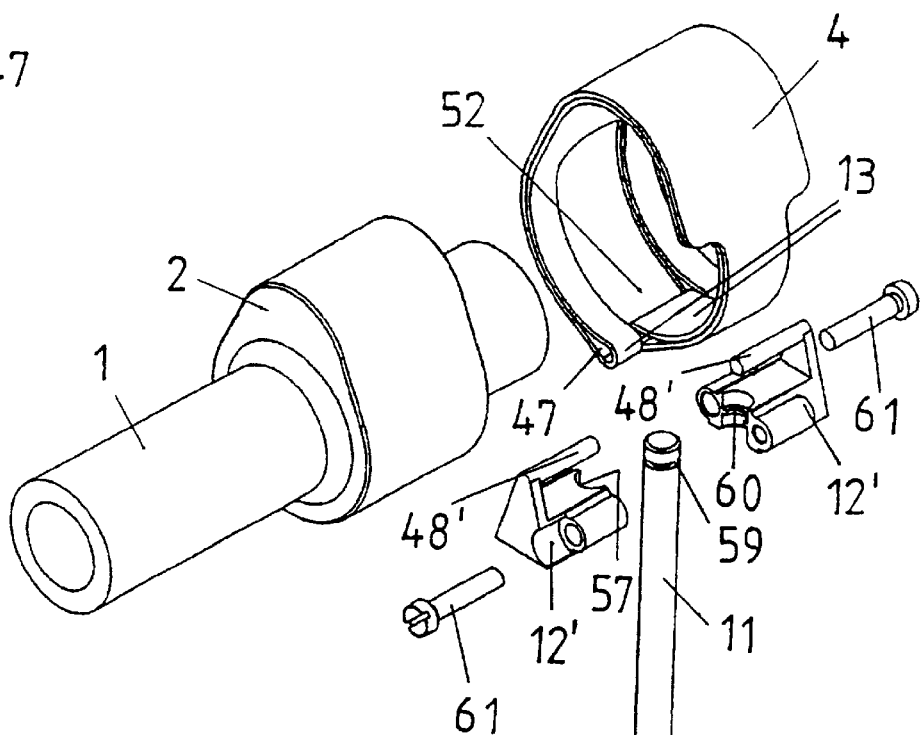
FIG. 47 shows integral parts of a seventeenth version in an oblique view.
Figure 48:
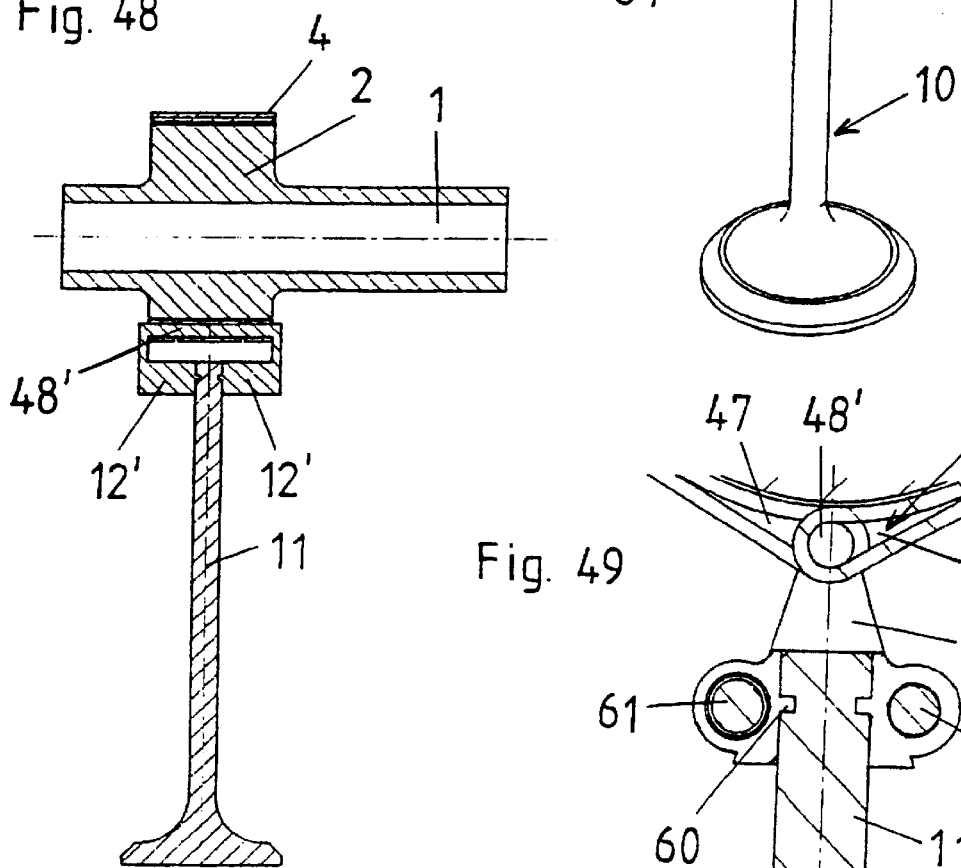
FIG. 48 shows a longitudinal section through the seventeenth version.
Figure 49:
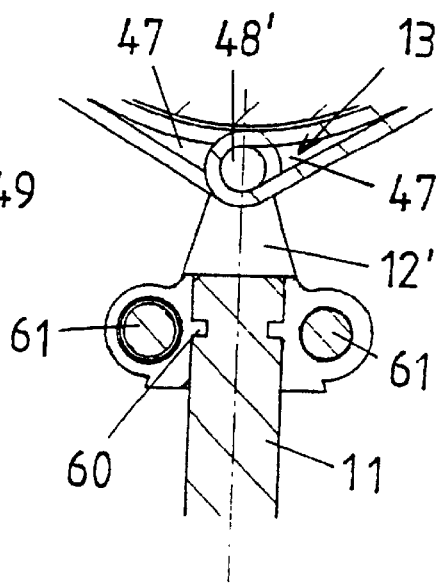
FIG. 49 shows an enlarged illustration of a detail from the seventeenth version.

FIGS. 47 to 49 show a version wherein, in a similar way to the version according to FIGS. 34 to 37, the surround element 4 consists of a band closed on itself which is made of fabric, spring steel or the like and is folded together to form an open two-ply loop and the reversals of which again form insertion orifices 47. The ends 13 of the open loop are cut out in such a way that they can be inserted one into the other in a similar way to FIGS. 18 to 20. In this version, the holder 12 is composed of two parts 12', each of which has a pin-shaped portion 48' of the connecting element 48, a receptacle and a threaded sleeve for a threaded screw 61. Two ribs 60 project into the likewise divided orifice 57 and engage into a circumferential groove 59 of the again rotatably held valve shank 11. The two pin-shaped portions 48' engage into the mutually aligned insertion orifices 47 of the ends 18 engaging one into the other and touch one another in the middle, as is evident from FIG. 48. In this version, the cam element 2 is not shown as an individually mountable part, but, instead, the camshaft is produced in one piece in a conventional method. Since the positive guidance of the valve actuator makes it possible to have a very lightweight form of construction of the valve mechanism, the entire camshaft may also be produced in a very lightweight form of construction. Said camshaft can therefore also be produced in one piece from an, if appropriate, reinforced plastic or other lightweight construction materials.

If a flat fabric strip is used for the surround element 4, its ends can either be stitched, adhesively bonded or welded to form a closed loop or be folded over and stitched, adhesively bonded or welded, in order to form insertion orifices 47 of the open loop. The apertures 5 or edge and middle cutouts 52 can readily be formed in fabric treated in this way.

The valve mechanism is shown, in all the versions, with a valve tappet as the valve actuator 10. The valve actuator 10 may, however, also comprise a pivotably mounted rocker arm or drag lever, on one end of which the surround element 4 is arranged pivotably about the axis 15. A camshaft for use with internal combustion engines conventionally has a plurality of valve mechanisms of this type, the cam elements being arranged so as to be angularly offset.

I claim:

1. A valve mechanism, comprising:
   at least one driven cam element and a valve actuator driven by said cam element;
   a flexible surround element, said cam element being rotatably disposed in said flexible surround element about an axis of rotation;
   a bearing pin inserted in an insertion orifice formed in said surround element, said bearing pin movably connecting said valve actuator to said flexible surround element for movement of said valve actuator in a plane perpendicular to the axis of rotation of said cam element.

2. The valve mechanism according to claim 1, wherein said flexible surround element is an open loop with two ends fixed to a holder of said valve actuator, and said insertion orifice is formed at at least one end of said loop.

3. The valve mechanism according to claim 2, wherein said two ends of said open loop pass through one another.

4. The valve mechanism according to claim 2, wherein said two ends of said open loop are formed with insertion orifices and each is formed with a cut-out region.

5. The valve mechanism according to claim 2, wherein said open loop is formed of a closed band led to and fro about said cam element, with reversals thereof forming said insertion orifices.

6. The valve mechanism according to claim 1, wherein the flexible surround element is a closed loop.

7. The valve mechanism according to claim 1, wherein said surround element comprises a loop formed of a sheetlike textile material.

8. The valve mechanism according to claim 7, wherein said textile material is a fabric containing threads running in a circumferential direction and formed of aramid fibers.

9. The valve mechanism according to claim 7, wherein said surround element is produced in a textile circular working process.

10. The valve mechanism according to claim 1, wherein said surround element is a leaf spring.

11. The valve mechanism according to claim 10, wherein said surround element is a two-ply element at least in a holding region of said valve actuator, and said insertion orifice is formed between two plies of said two-ply element.

12. The valve mechanism according to claim 1, wherein said surround element is a band spring provided in a plurality of turns one above the other.

13. The valve mechanism according to claim 6, wherein said flexible surround element is a plastic ring.

14. The valve mechanism according to claim 13, which comprises a steel band adjoining said plastic ring.

15. The valve mechanism according to claim 13, wherein said plastic ring is formed with a recess, and said bearing pin of said valve actuator is received in said recess.

16. The valve mechanism according to claim 1, wherein said cam element is formed with two axially spaced-apart cam regions and a middle region forming a circumferential groove.

17. The valve mechanism according to claim 16, wherein a holder of said valve actuator engages into said circumferential groove.

18. The valve mechanism according to claim 2 or 17, wherein the holder is composed of two parts enclosing the valve actuator.

19. The valve mechanism according to claim 1, which comprises a holder for said valve actuator and said valve actuator is arranged adjustably in length on said holder.

20. The valve mechanism according to claim 1, wherein the valve actuator is arranged rotatably in the holder.

21. The valve mechanism according to claim 1, which comprises a feed device with a feed orifice for supplying a friction-reducing medium into a space between a peripheral surface of said cam element and an inner surface of said flexible surround element.

22. The valve mechanism according to claim 21, which comprises a hollow carrier shaft supporting said cam element and having at least one bore formed therein, and wherein, for an internal supply of the friction-reducing medium, said cam element is formed with at least one bore that extends radially with respect to said axis of rotation and is aligned with said at least one bore in said carrier shaft.

23. The valve mechanism according to claim 1, wherein said cam element is formed with a circumferential groove and a feed opening for feeding friction-reducing medium formed in said circumferential groove.

24. The valve mechanism according to claim 1, which comprises a carrier shaft supporting said cam element and having at least one bore formed therein, and wherein said cam element is formed with at least one bore aligned with said bore of said carrier shaft, and a pin inserted in said bores for securing said cam element against a rotation on said carrier shaft.

* * * * *

UNITED STATES PATENT AND TRADEMARK OFFICE
CERTIFICATE OF CORRECTION

PATENT NO. : 6,705,262 B2
DATED : March 16, 2004
INVENTOR(S) : Stefan Battlogg

It is certified that error appears in the above-identified patent and that said Letters Patent is hereby corrected as shown below:

Title page,
Item [76], Inventor, should read as follows:

-- Stefan Battlogg, Haus Nr. 166, A-6771 St. Anton/Montafon (AT) --

Signed and Sealed this

Fourteenth Day of September, 2004

JON W. DUDAS
*Director of the United States Patent and Trademark Office*